US011843897B1

(12) United States Patent
Slotznick

(10) Patent No.: US 11,843,897 B1
(45) Date of Patent: *Dec. 12, 2023

(54) METHOD OF USING ONLINE, REAL-TIME, INTERACTIVE, MULTIPLANE CAMERA VIEW TO ENHANCE VIDEOCONFERENCING PLATFORMS

(71) Applicant: Benjamin Slotznick, Mt. Gretna, PA (US)

(72) Inventor: Benjamin Slotznick, Mt. Gretna, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,194

(22) Filed: Mar. 3, 2023

Related U.S. Application Data

(63) Continuation of application No. 17/939,359, filed on Sep. 7, 2022, now Pat. No. 11,601,618.

(60) Provisional application No. 63/313,910, filed on Feb. 25, 2022, provisional application No. 63/241,809, filed on Sep. 8, 2021.

(51) Int. Cl.
*H04N 7/14* (2006.01)
*H04N 7/15* (2006.01)

(52) U.S. Cl.
CPC ............ *H04N 7/147* (2013.01); *H04N 7/15* (2013.01)

(58) Field of Classification Search
CPC ...................................................... H04N 7/147
See application file for complete search history.

(56) References Cited

U.S. PATENT DOCUMENTS

| 2,198,006 | A | 4/1940 | Garity |
| 8,248,455 | B2 | 8/2012 | Eisenberg et al. |
| 8,947,497 | B2 * | 2/2015 | Hines ............... H04N 7/15 348/14.08 |
| 9,049,033 | B2 * | 6/2015 | Lemmey ........... H04L 12/1827 |
| 9,344,681 | B2 | 5/2016 | Block et al. |
| 10,773,162 | B1 * | 9/2020 | Harris ............... A63F 13/355 |
| 11,107,490 | B1 | 8/2021 | Slotznick |

(Continued)

OTHER PUBLICATIONS

"Zoom's new tools let you rearrange and pin multiple videos", by Abrar Al-Heeti, dated Sep. 24, 2020, published on CNET. Downloaded from webpage https://www.cnet.com/tech/mobile/zooms-new-tools-klet-you-arrange-and-pin-multiple-videos, on Sep. 2, 2021. Original posting date: unknown, 3 pages.

(Continued)

*Primary Examiner* — Olisa Anwah
(74) *Attorney, Agent, or Firm* — Panitch Schwarze Belisario & Nadel LLP

(57) ABSTRACT

A user interface display is provided to a participant who is viewing an event via a communication system that provides videoconferencing. The communication system provides a composite video stream that includes a plurality of different video layers, each video layer providing a different portion of the composite video stream. The participant has a participant computer for allowing the participant to receive the composite video stream for display on the user interface display. A plurality of participants view the event via user interface displays of their respective participant computers. The layers include a participant layer that displays video streams of the participants, a foreground layer, an event layer that includes video of the event, an audience layer, a background layer, and an immersive layer.

21 Claims, 15 Drawing Sheets

(56) References Cited

U.S. PATENT DOCUMENTS

| | | | |
|---|---|---|---|
| 11,282,532 | B1 | 3/2022 | Slotznick |
| 11,330,021 | B1 | 5/2022 | Slotznick |
| 2021/0084347 | A1* | 3/2021 | Chen ................. H04N 23/45 |
| 2021/0266613 | A1* | 8/2021 | da Silva Pratas Gabriel ............ H04N 21/8455 |
| 2022/0051412 | A1* | 2/2022 | Gronau ............... G06N 20/00 |
| 2022/0210483 | A1* | 6/2022 | Ross .................. H04L 65/1059 |
| 2022/0286625 | A1 | 9/2022 | Afrasiabi |

OTHER PUBLICATIONS

"A better way to work", product description of the Gather videoconferencing platform from Gather Presence, Inc. Downloaded from webpage https://www.gather.town, on Sep. 2, 2021. Original posting date: unknown, 6 pages.
"Body Segmentation" an article by Snap Inc. on how to use portions of its Lens Studio software. Downloaded from webpage https://lensstudio.snapchat.com/templates/world/body-segmentation/, on Sep. 2, 2021. Original posting date: unknown, 24 pages.
"Virtual Background Changer: what it is and how it works", by Alexei Kovalev, dated May 3, 2020. Downloaded from https://www.banuba.com/blog/virtual-background-changer-what-it-is-and-how-it-works, on Sep. 2, 2021. Original posting date: unknown, 16 pages.
"Immersive View" description of Zoom product feature from Zoom Video Communications, Inc.; last updated: Aug. 22, 2021. Downloaded from webpage: https://support.zoom.us/hc/en-us/articles/360060220511-Immersive-View.
"Hand Gestures" an article by Snap Inc. on how to use portions of its Lens Studio software. Downloaded from webpage https://lensstudio.snapchat.come/guides/general/hand-gestures/, on Sep. 2, 2021. Original posting date: unknown, 7 pages.
"Full Body Triggers" an article by Snap Inc. on how to use portions of its Lens Studio software. Downloaded from webpage https://lensstudio/snapchat.com/templates/object/full-body-triggers/?utm_source=lensstudio, on Sep. 2, 2021. Original posting date: unknown, 18 pages.
"Touchless User Interface" an article by Banuba on how to use portions of its software. Downloaded from webpage https://www.banuba.com/solutions/touchless-user-interface , on Sep. 2, 2021. Original posting date: unknown, 14 pages.
"What is the in-room experience like?", service description from Flymachine. Downloaded from webpage https://support.flymachine.com/support/solutions/articles/69000276305-what-is-the-in-room-experience-like-, on Sep. 2, 2021. Original posting date: unknown, 2 pages.
"Multiplane Camera", entry on the Disney Wiki, maintained by the Fandom. Downloaded from webpage https://disney.fandom.com/wiki/Multiplane_camera, on Sep. 2, 2021. Original posting date: unknown, 5 pages.
Wikipedia entry for "2.5D", downloaded from web page: https://en.wikipedia.org/wiki/2.5D, download date: Sep. 2, 2021. Original posting date: unknown, 11 pages.
"The neurochemistry and social flow of singing: bonding and oxytocin", by Jason R. Keeler, Edward A. Roth, Brittany L. Neuser, John M. Spitsbergen, Daniel J.M. Waters, and John-Mary Vianney, published in Frontiers of Human Neuroscience, Sep. 23, 2015. Downloaded from webpage: https://www.frontiersin.org/articles/10.3389/ fnhum.2015.00518/full, on Sep. 3, 2021. Original posting date: unknown, 19 pages.
"The science behind why choir-singing is good for you", by Sarah Claydon at the Canadian Broadcasting Corporation (CBC). Downloaded from webpage: https://www.cbc.ca/radio/blogs/the-science-behind-why-choir-singing-is-good-for-you-1.4594292, on Sep. 3, 2021. Posted Mar. 29, 2018, last updated Mar. 29, 2018, 6 pages.
"Links Between the Neurobiology of Oxytocin and Human Musicality", by Alan R. Harvey, published in Frontiers of Human Neuroscience, Aug. 26, 2020. Downloaded from webpage: https://www.frontiersin.org/articles/10.3389/fnhum.2020.00350/full, on Sep. 3, 2021. Original posting date: unknown, 14 pages.
"What happens to your body and brain when you watch football", by Scott Muska for NBC News, published Oct. 26, 2017, updated Feb. 4, 2018. Downloaded from webpage: https://www.nbcnews.com/better/health/what-happens-your-body-brain-when-you-watch-football-ncna814401, on Sep. 3, 2021. 6 pages.
"How to get the most from Together Mode", by Jaron Lanier, for Microsoft Tech Community, published on Jul. 8, 2020. Downloaded from webpage: https://techcommunity.microsoft.com/t5/microsoft-teams-blog/how-to-get-the-most-from-together-mode/ba-p/1509496, on Sep. 3, 2021. 13 pages.
"Microsoft Teams: This new mode makes your video meetings less exhausting and more productive", by Mary Branscombe in TechRepublic from TechnologyAdvice, published on Sep. 15, 2020. Downloaded from webpage: https://www.techrepublic.com/article/microsoft-teams-thjis-new-mode-makes-your-video-meetings-less-exhausting-and-more-productive/. on Sep. 3, 2021. 14 pages.
"Hand Segmentation" an article by Snap Inc. on how to use portions of its Lens Studio software. Downloaded from webpage: https://lensstudio.snapchat.com/templates/object/hand-segmentation/, on Sep. 3, 2021. Original posting date: unknown, 21 pages.
"Feb Club Mug-R" by Ben Slotznick, an image of an virtual beer mug, created as a lens for the SnapChat Camera, using Lens Studio from Snap, Inc. When enabled the virtual beer mug will appear in a person's hand when the person makes a fist (as if holding a mug). Downloaded from webpage: https://lens.snapchat.com/89469d4937db48f8a9d5d3162a288c13, on Sep. 3, 2021. Original posting date: unknown, 2 pages.
"Del Furano: The Guy Who Made Concert Tees Cool on 40 Years of Retail Hits", by Melinda Newman for Billboard from Billboard Media, LLC, dated May 22, 2017. Downloadeed from webpage: https://www.billboard.com/articles/news/magazine-feature/7800218/dell-furano-concert-tees-40-years, on Sep. 3, 2021. 15 pages.
Wikipedia entry for "Isadora (software)", downloaded from web page: https://en.wikipedia.org/wiki/Isadora_(software), download date: Oct. 4, 2022. Original entry: Dec. 16, 2005; updated: Mar. 2, 2021, 2 pages.
"Billie Eilish's Virtual ConcertIs the Rare Livestream Done Right", music concert review by Amy X. Wang, in Rolling Stone, from Penske Business Media, LLC, dated Oct. 26, 2020. Downloaded from webpage: https://www.rollingstone.com/music/music-live-reviews/billie-eilish-livestream-virtual-concert-1080748/ on Oct. 4, 2022. 4 pages.
"Off the Couch: Virtual Dance Party" event series description from producer/sponsor Words, Beats, & Life Inc. Downloaded from webpage: https://wblinc.org/offthecouch, on Oct. 5, 2022. 1 page.
"Isadora Features: Specifications", product description from Troikatronix. Downloaded from webpage: https://troikatronix.com/isadora-features/specifications/, on Oct. 5, 2022. Original posting date: unknown, 1 page.
"What is Isadora", a review of Isadora features by practitioner Lucas Wilson-Spirolsadora. Downloaded from webpage: https://lucaswilsonspiro.wordpress.com/isadora/what-is-isadora/, on Oct. 5, 2022 Original posting date: unknown, 2 pages.
Wikipedia entry for "Multiplane camera." downloaded from web page: <https://en.wikipedia.org/wiki/ Multiplane_camera>, download date: Aug. 26, 2021, Page last edited: Aug. 10, 2021, original posting date: unknown, 4 pages.

* cited by examiner

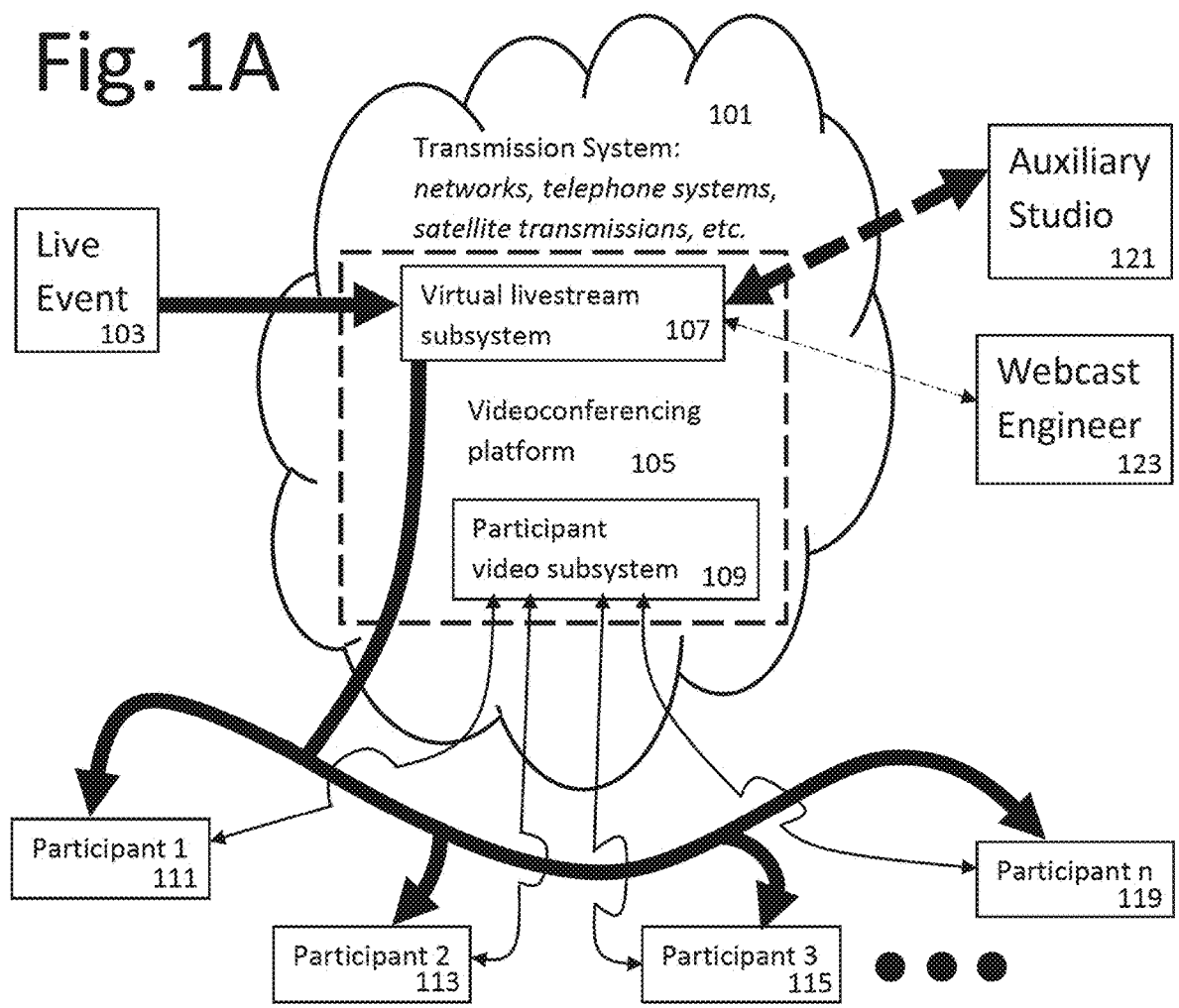

METHOD OF USING ONLINE, REAL-TIME, INTERACTIVE, MULTIPLANE CAMERA VIEW TO ENHANCE VIDEOCONFERENCING PLATFORMS

CROSS-REFERENCE TO RELATED APPLICATIONS

This application is a continuation of copending U.S. Non-Provisional patent application Ser. No. 17/939,359 filed Sep. 7, 2022, which is incorporated by reference herein.

This application claims priority to U.S. Provisional Patent Application Nos. 63/313,910 filed Feb. 25, 2022 and 63/241,809 filed Sep. 8, 2021, both of which are incorporated by reference herein.

The present application relates to U.S. Pat. No. 11,107,490 (Slotznick); U.S. Pat. No. 11,330,021 (Slotznick); and U.S. Pat. No. 11,282,532 (Slotznick), each of which are incorporated by reference herein, particularly with respect to the description of the architectures of videoconferencing and teleconferencing systems in the '490 patent (see, particularly, FIGS. 4 and 5 and the related discussion), and the ability of those systems to distribute and process multiple audio and visual streams; the mirroring feature in the '021 patent; and the participant's ability to control the volume of music in the '532 patent. Each of these patents are discussed below with respect to selected features of the patents that may also be used with the present invention.

BACKGROUND

The general field of the invention is the striving to create three-dimensional-like experiences within the context of videoconferencing systems which use two-dimensional computer screens. Embodiments of the present invention use video processing techniques along with augmented reality (AR) and artificial intelligence (AI), which together enhance three-dimensionality on a 2D screen. This is distinct and in contrast to the true 3D modeling offered by virtual reality (VR) headsets such as manufactured by Oculus. Videoconferencing platforms and systems, along with their software and hardware, as well as associated screens, monitors, and displays, are employed so that people in different locations, physically remote from each other, can hold and attend gatherings, meetings, and social or entertainment events in real time, both seeing and hearing each other during the meeting or event.

The present invention teaches how to use a novel multiplane-camera view for videoconferencing platforms, which adds new and more enveloping 3D features to the real-time seen videoconference environment. As discussed below, prior art teaches away from these features.

As continued background, recent years have seen an increase in the use of videoconferencing systems and software such as Zoom®, Microsoft Teams®, Intermedia Unite® and AnyMeeting®, Cisco Webex® Meetings, ClickMeeting®, Google Meet™, Slack®, Zoho Meeting, Join.Me®, Wonder, Gatherly, Jitsi, Gather, Hopin, and Flymachine. Use has exploded during the coronavirus pandemic, with the accompanying shelter-in-place orders.

These videoconferencing systems—especially during times of sheltering-in-place—have been employed not only for business meetings and educational webinars, but also to stage social events such as game-nights, networking get-togethers, rock concerts and dance parties. Currently, videoconferencing platforms—especially with the relaxation (but not elimination) of social distancing regulations—continue to explore ways to facilitate hybrid events, combining both in-person audience and online attendees.

The online experience of an event will never be exactly like the in-person experience. For example, the senses of smell and touch that come from being jostled on a crowded dance floor cannot be duplicated remotely within a Zoom dance party. The online experience is limited to what the attendee can see on a two-dimensional screen and hear from the user's computer speakers. Nonetheless, the methods by which the flat screen presentations of animated cartoons and motion pictures elicit strong emotional reactions in their audiences and a sense of presence and place can do the same for online experiences.

As continued background, videoconferencing and teleconferencing systems employ the internet to connect people, each at physically separate (and distant) locations by way of each person's computing device including, but not limited to, a desktop computer, a laptop computer, a workstation, computer server, a smart phone, or a tablet computing device. In the discussions and descriptions below, mention of a computer or computing device, is intended to include all of the above, and any similar electronic device which performs similar computational functions.

A number of videoconferencing platforms (including Zoom and Flymachine) send distinct and separable video streams of the meeting host and participants, so that a participant-user can reposition those video streams within the screen interface, such as within a window or other software container. See for example, https://www.cnet.com/tech/mobile/zooms-new-tools-let-you-rearrange-and-pin-multiple-videos/. Participants also have the limited ability (depending upon platform) to change the size and resolution of specific video streams.

Videoconferencing platforms show thumbnail videos of online audience members to create a sense that all of the participants are in each other's presence. The video of the person speaking may fill up most of the screen, but with smaller thumbnails of other participants shown elsewhere on the screen (such arrangements are called "speaker view"). Alternatively, many videoconferencing platforms also offer a grid arrangement of audience video thumbnails on the screen with most of the thumbnails of equal size, or relatively equal size (called "gallery view"). This arrangement of videos often looks like an episode of the old Hollywood Squares television program.

Some videoconferencing systems (like Teooh) attempt to create a more three-dimensional experience by replacing real-time videos of users with 3D animated avatars, so that participants can be placed in a game-like simulacrum of a three-dimensional space. Some platforms (such as Gather at https://www.gather.town/) combine aspects of a game-like world that uses avatar-based navigation to navigate between locations on the screen, between conversations among clusters of users, and between online experiences. This is combined with more gallery-like video display of participants when they are in a discussion.

During the past year, videoconferencing platforms have begun experimenting with image layering and transparent backgrounds as tools for displaying participant videos in ways that make it look more like the participants are together in the same three-dimensional space. A combination of video production techniques, augmented reality (AR) and artificial intelligence (AI) allows backgrounds to be cut out of (or made transparent with respect to) the video feed of a single person—in real time—in the case of faces, portraits (that is, upper torsos), and even full bodies. Methods of such background removal are well known to those skilled in the art of augmented reality and are sometimes called background segmentation, portrait segmentation, or body segmentation. Other video production techniques involved include, but are not limited to, alpha channel (also referred to as alpha plane) and chroma key (also referred to as green screen or blue screen techniques, color keying, and color-separation overlay).

These technologies allow Zoom, Microsoft (Teams and Skype), and virtual cameras—as used in ManyCam, OBS (Open Broadcaster Software), and Snap Camera—to place a virtual background behind a user in the user's own individual video feed (or thumbnail video). See for example the article on using body segmentation templates in SnapChat's Lens Studio when creating filters for Snap Camera (https://lensstudio.snapchat.com/templates/world/body-segmentation and its accompanying video). See also discussion of Banuba's virtual background changer at https://www.banuba.com/blog/virtual-background-changer-what-it-is-and-how-it-works. SnapChat's Lens Studio can even accomplish this with respect to two bodies that appear in a video feed at the same time.

In video games, 2-dimensional backgrounds are enhanced to give the illusion of 3-dimensionality by using techniques of ray tracing and ray projection to create a projected skybox or skydome in the background layer.

Some platforms (such as Zoom, Microsoft Teams, and Skype) use these AR techniques of creating transparencies, along with image layering, to build a two-dimensional "immersive scene view" (called "Immersive View" by Zoom and "Together Mode" by Microsoft Teams and Skype), in which participant videos are placed within a static scene or scenic backdrop. Zoom uses AR techniques to provide Immersive View in which the background of each participant video is removed by the videoconferencing software (as if the participants were being videoed in front of a green screen), and the participant videos (sans background) are placed in what appear to be seats in a room (such as an auditorium, a classroom, a learning pod, a board room, a cafe, a living room with fireplace, etc.) or placed as if sitting behind the counter of the island in a kitchen (https://support.zoom.us/hc/en-us/articles/360060220511-Immersive-View). Microsoft and Skype provide something that looks similar.

Zoom and Microsoft background segmentation employ a form of portrait segmentation that works when the video feed captures the user's upper body or face (as if the user is sitting in front of a desktop computer). These AR-enhanced immersive scene views are designed for static seating arrangements of corporate meetings, panel discussions, and classrooms.

This kind of implementation teaches away from user repositioning of their videos within the virtual immersive scene as well as user movement from a seated position. Zoom, Microsoft, and Skype deploy two techniques which assume that for an immersive scene view, people are (and remain) seated—each at one place. First, hosts manually place participants in seats (similar to assigning seats in the classroom) or the software can place participants in seats automatically, but in any event, users cannot navigate around or move their videos within the scene. The system software has not been coded to permit this because in the conceptual framework of a static meeting, there is no reason for them to do so. Second, because these platforms assume seated users, portrait segmentation of the upper body is employed rather full-body segmentation. (A user holding a smartphone also presents only a face or upper body to the smartphone camera.) There is no reason to add the additional processing needed for full-body segmentation. Consequently however, the users' video feeds disappear or become unstable if users stand up and dance!

Note: immersive scene views in current videoconference platforms do not use full-body segmentation, nor do they overlay full bodies with transparent backgrounds over other images or videos.

AR software also uses AI to recognize a variety of hand gestures and body poses. See for example gesture recognition in Snap Camera's Lens studio (https://lensstudio.snapchat.com/guides/general/hand-gestures/) as well as their full-body triggers (https://lensstudio.snapchat.com/templates/object/full-body-triggers/?utm_source=lensstudio). The recognized gestures (as well as body poses and directional orientations) can be used by coders of AR software programs to trigger other actions. See for example Banuba's use of hand gesture recognition to create touchless user interfaces for real-time program control: https://www.banuba.com/solutions/touchless-user-interface.

Zoom has an additional, less static implementation of its Immersive View: the "My Video" variation. This implementation allows videos of participant upper-bodies (again sans background) to overlay the host's video—that is, the host's video acts as the scenic backdrop to the participant videos—so that the participants appear to be in the same physical or virtual space as the host.

In contrast to Zoom's approach to Immersive View", Flymachine employs image layering with transparency, without AR background segmentation. Flymachine presents live events (such as rock concerts), but adds videoconference capabilities that allow fans to talk to each other. Flymachine's presentation has some similar visual characteristics as Zoom's MyVideo Immersive View.

In the Flymachine platform, a livestream of the event acts as the scenic backdrop, and participant videos (with their backgrounds) appear overlaid on it in thumbnails with hexagonal or circular frames. Within each thumbnail, the background is not transparent, but the area between the video thumbnails is transparent. The video of the live event is a separate unitary event livestream (which Flymachine calls the "hero stream"). The event stream is distinct from the participant videos, and participants can adjust the audio of the music livestream separately from the audio from participant videos.

The event stream, though unitary, is produced by Flymachine by switching among multiple live camera feeds with transitions between camera angles and other visual effects. In Flymachine, the user can move his or her video thumbnail within the lower half of the overlaid layer that contains participant videos. (For explanation of moving a user's video thumbnail within Flymachine—in a circular bubble—to be next to another user's video (where the videos become attached hexagons), in order to have a "cluster" of videos of users, who can then hear each other's audio and thereby converse, see: https://support.flymachine.com/support/solutions/articles/69000276305-what-is-the-in-room-experience-like-). Flymachine users can also view additional overlaid data, such as text chat and lists of public rooms that participants can join.

The focus of an online live concert production company, such as Flymachine, has been to create an event livestream that has as much polish and visual interest as a motion picture film of a rock concert, or as a network television production of a live music event. Flymachine overlays on top of this event stream a videoconference (with participant video feeds). Though production may employ multiple cameras, or add additional studio effects, the intent is to output to the user a complete experience, without user input. This top-down directorial focus on the event production aspects of the platform teaches away from (a) adding more image layers over the event stream that interfere with the composition of the director's framing shots, (b) adding user-selectable overlaid elements (such as foreground layers) which interfere with directorial choices, and (c) adding alternate layers or immersive scene views by which users can tailor the event visual experience to something quite different, but more to their own liking.

In comparison, the multiplane camera was not intended for live events of any kind. The multiplane-camera approach was originally used to film frame-by-frame movie animation of cartoons. It was developed in the 1920s and 1930s. The Walt Disney company popularized its use for film production (such as Snow White) and built a physical camera with multiple planes on which painted artwork with transparent areas could be placed (U.S. Pat. No. 2,198,006 (Garity) and assigned to Walt Disney Productions). This physical camera was later replaced by a software-based digital multiplane camera. The multiplane camera approach to animation was phased out after Pixar built computers and animation software with enough processing power to produce true 3-D modeling for animation.

In contrast to true three-dimensional modeling used in many of today's animated movies and electronic video games, the multiplane camera approach (as explained in the Disney Wiki at https://disney.fandom.com/wiki/Multiplane_camera) "moves a number of pieces of artwork past the camera at various speeds and at various distances from one another. This creates a three-dimensional effect, although not actually stereoscopic." The method most often uses 2D artwork with transparencies in three or more planes. See also "parallax scrolling" in https://en.wikipedia.org/wiki/2.5D along with other "2.5D" methods of simulating true 3D modeling. In addition to scrolling, the approach can produce a rotation effect.

At the time of the development of the multiplane camera, standard animation worked with two planes: a painted background plane and the cartoon character(s) overlaid on top of it. The multiplane camera operated with up to seven planes. The multiplane camera approach not only increased the three-dimensionality of cartoon characters moving through a scene or landscape, but when the characters left the screen—or stopped moving within it—the scene did not appear flat, but rather remained alive as the camera continued to move around and within it.

The phrase "multiplane camera view" used herein refers to a video feed presented to a user on his or her computer screen, in which (a) multiple layers have been captured, arranged, processed, and displayed as if filmed by a multiplane camera, and (b) the user interacts with and enables these layers, including the layer(s) with his or her own video feed. The user is somewhat like a self-aware cartoon character within the scene being filmed by a multiplane camera, who operates the multiplane camera that is filming the scene.

In addition to the prior art discussed above, U.S. Pat. No. 8,248,455 (Eisenberg et al.) discloses a method for creating a videoconferencing view as part of a videoconferencing session wherein a person can design (and save) one or more custom composed views for a videoconference prior to that session. These saved views are subsequently used in that session and the saved view design files (which Eisenberg et al. calls "view description files") control the views of all session participants. More specifically, Eisenberg et al. provides a custom-composed view design file that specifies the location and content of objects within the videoconferencing view, as well as specific and pre-session specified transitions between session views. The view design file defines levels of the objects to be displayed in the video. Furthermore, the view design file includes two or more files, each file corresponding to a layer in the video. However, while the person designing a view file may subsequently become a videoconference participant in a session utilizing that view file, Eisenberg et al. does not appear to permit any conference participant (including the designer) to customize the view file during the session, that is, after initiation of the session. More specifically, in the Eisenberg et al. paradigm, session participants do not appear to be able to change, manipulate, or customize any of the views and layers utilized in a videoconference session during that session. Additionally, Eisenberg et al. does not appear to allow session participants to manipulate and modify the display and placement of objects utilized in the videoconference session during that session. In this manner, Eisenberg et al. does not appear to disclose many of the current videoconference paradigms discussed above, as well as the present invention. The layers in the present application are further distinguished from the layers in Eisenberg et al. in the "Additional Considerations" section below.

SUMMARY OF THE INVENTION

The present invention teaches a videoconferencing system which presents a multiplane camera view to participants, (a) by transmitting at least several different video streams which are displayed in at least several different layers, at least one of which layers is above (or covers) participant videos, (b) by enabling participants to elect which layers to display and to adjust aspects of the layers in order to create an experience most engaging for them, and (c) by displaying participant videos with full-body segmentation and/or gesture recognition so that participants can move their displayed images among layers within the virtual environment. The multiple layers create a 3D effect for the environment behind the participant video streams, which is enhanced by automatic adjustment of the layers as a participant "moves" among them. Just as importantly, scenic images in front of participant videos—even if transitory, such as a bird flying in front of everyone—create the appearance that the participants are within, or enveloped by, their environment. By choosing which layers to display (and how to display them), participants change the setting, mood, and intimacy of the event, even with the same music and event stream. These choices promote (or suppress) talking and dancing among participants. Full-body segmentation permits simulation of participants dancing together—as opposed to just by themselves. As noted above, the current usage of prior art does not include these features and teaches away from embodiments of the present invention with these characteristics.

Consider the following layers with associated streams that are exemplars of a preferred embodiment of the present invention. The layers include, but are not limited to, the following:

(a) One or more background layers.
(b) One or more event layers. Each event layer includes a video stream of a view of the event. For example, event layers of a rock concert include (but are not limited to) the entire rock band, the lead singer of the band, the drummer, and the lead guitarist. Event layers of a sporting event include (but are not limited to) the entire sport field with all teams shown, a particular section of the field, a coach talking to athletes on the sidelines, a video focused on a particular player such as a quarterback or receiver in football, or the lead swimmer or runner in an Olympic event, etc. Examples include event layers from both physical sporting events and virtual ones (that is, esports). As examples, the event layer is based on a stationary or mobile camera, or a produced layering and transitioning of camera angles and effects, stickers, scenes, overlays, lower thirds, scrolling tickers, filters, backgrounds, etc.

(c) One or more audience layers. Each audience layer includes a video showing the audience. The audience layer has transparency on the portion of the layer in which the audience does not appear, or crops out that section of the video. Audience layers overlay event layers, but may also be behind them. (Many sporting events and concerts occur in venues with audience members on three or four sides of the players.) Variations in camera angle for the audience video include (but are not limited to) from in front of the audience, from the back of the audience, or from a side view. Sources for the audience layer include a live stream video, a pre-recorded video, or a looping video. These video streams include those that are raw, edited and filtered, or an animated simulation. In a preferred embodiment of the audience for a music event, the audience includes people dancing. In an alternative preferred embodiment, the transmissions include several different audience layer streams that transmit videos of audiences engaged in different styles of dance to the same kind of music. For example, a particular piece of music inspires some to dance in a concert mosh pit, while in a less crowded space it inspires a classic tango. Alternatively for a sporting event or a concert, a preferred embodiment of the audience layer include members of the audience seated in raked stadium seating. For a sporting event, an alternative embodiment includes separate streams for audiences of the competing teams, who will be cheering or booing at different times. In a preferred embodiment, audience members are fully rendered. In an alternative preferred embodiment, they appear in silhouette, outline, or partially transparent.

(d) One or more immersive layers. In an immersive layer, participant videos (see below) appear to be embedded within it. Immersive layers overlay previously mentioned ones. An immersive layer represents or simulates a room or environment in which participants could be physically present to experience the event. Examples of immersive scenes include (but are not limited to) various seating arrangements, including (but not limited to) those used in Zoom immersive layers. Others include seats, tables, or a seating booth at a night club, in a stadium skybox, or an opera box. Alternatively, an immersive layer is composed using its own video, such as a set of surfboards, surfing on a wave, from which participants (whose videos appear as overlaid on the surfboards) appear to be surfing while all watch a surfing competition.

(e) A participant layer. The participant layer (or set of layers) displays the video streams of the participants. The participant layer can itself be a composite of multiple layers. (Participant layers overlay previously mentioned ones, particularly immersive layers.) If a participant has turned off his or her webcam, in a preferred embodiment this layer represents him or her using the participant's initials, or a stored headshot photo. In most cases, each webcam produces one video feed of a participant (or group of participants sitting/standing together), but recent advances allow one webcam to produce several individual video feeds of the individual participants sitting in front of the webcam (e.g. the Owl Labs webcam or cameras designed for Zoom Room Smart Gallery installations including webcams from DTEN, Neat, Poly, Logitech, and Yealink). In a preferred embodiment, the participant video streams include the background in each such video. An alternative embodiment deletes all backgrounds using green screen or AR technology, in order to display the participants in an immersive layer or among the audience. Participant videos include headshots, upper torsos (as if sitting at a desk) and full body videos. In a preferred embodiment, the participant videos each have a frame, one of which is highlighted to indicate who is talking. Alternatively, when participant video backgrounds are deleted, the participant videos have a software-created "shadow" or "aura" acting like an outline or frame to highlight who is speaking. (Methods of accomplishing this are well known to those skilled in the art of AR.) Within this layer, participants have the ability to group themselves into pairs, clusters, circles, or groups, in methods well known to practitioners of the art. Participant video feeds (as viewed by other participants) may be mirrored versions of what their webcam has captured, as described in U.S. Pat. No. 11,330,021 (Slotznick), to promote interaction of gaze and gesture. The mirroring may be imposed by a host, a participant who initiates a breakout room, or self-selected by participants. The mirrored video feeds may be visually distinct from non-mirrored ones.

(f) One or more foreground layers. The foreground overlays those layers previously mentioned. The purpose of the foreground is to give the illusion of three-dimensionality. That is, to make the participants and their videos appear more embedded in the action. At the same time, participants should not be obscured. For that reason, though in a preferred embodiment, the foreground is a live video, in an alternative embodiment it is pre-recorded or animated, with filters and transparencies to create the appearance of the foreground being in the action without completely covering underlying participants. In a preferred embodiment, the foreground is fully rendered. In an alternative embodiment it appears in silhouette, outline, or partially transparent. In a preferred embodiment, objects in the foreground are limited primarily to the edges of the screen in order not to obscure participants. The foreground provides a peripheral visual on the screen, simulating a feeling that other people are "around" the participants. In alternative embodiments, objects in the foreground are more dispersed or pervasive.

(g) One or more data (top) layers. These layers display text information such as text chat, participant lists, Question and Answer discussions, etc.

Interaction of the various layers is disclosed in detail below. In addition, in a preferred embodiment each participant is given the ability to adjust the display of each layer in several ways including (but not limited to) the ways listed below, in order to create the experience most immersive to that participant. In an alternate preferred embodiment, a pre-determined class of participants (such as those who set up or start rooms, groups, clusters, circles or other subsets of participants) chooses which layers are implemented and displayed. This enables an online event to have a variety of experiences from which participants choose. For examples involving a live event in which musicians play, the different experiences include (but are not limited to) a dance floor to encourage dancing and a seating booth with table to encourage conversation. For examples involving a live sporting event, the different experiences include experiences with audience layers from the home team, as well as experiences with audiences from the opposing team. This way fans of one particular team experience the enthusiasms of people like them. Interactions include:

(a) Hide or display a layer. In a preferred embodiment each participant can hide any layer. In an alternative preferred embodiment, the ability to do this is restricted by the event host or producer to particular layers or particular participants.

(b) Enlarge, reduce, or reposition the display of the stream shown in each layer. When a participant adjusts a particular layer, other layers are adjusted automatically to present an optimal view.

(c) Choose among views for a layer when several views are available. For example, for a group of friends gathering together at an online music event, experiences include (a) standing right in front of the musicians, (b) dancing to the music in the middle of the dance floor, and (c) sitting in a skybox or table in a club, with the music (and musicians) in the background.

Some examples of how the present invention provides a variety of ways to experience a live event include:

(a) Turning off all layers but the event layer of a rock musician to simulate being in the front row of a rock concert.

(b) Turning on the event layer of a rock band, plus a dancing audience layer, the participant layer and the foreground layer to simulate being on a dance floor of a club with your friends or in the mosh pit at a rock concert.

(c) Turning on the event layer of a football game, the home-team audience in stadium seating, and the participant layer to simulate being in a stadium with your friends for a bowl game.

(d) Turning on the event layer of jazz musicians, an immersive layer of a seating booth in a club, and the participant layer to simulate sitting at a table with your friends at a jazz club.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1A is a schematic view of the generalized systemic information flows involved in a videoconferencing platform presenting a live event to an interacting audience, in both prior art and one preferred embodiment of the present invention.

Figure 11A:
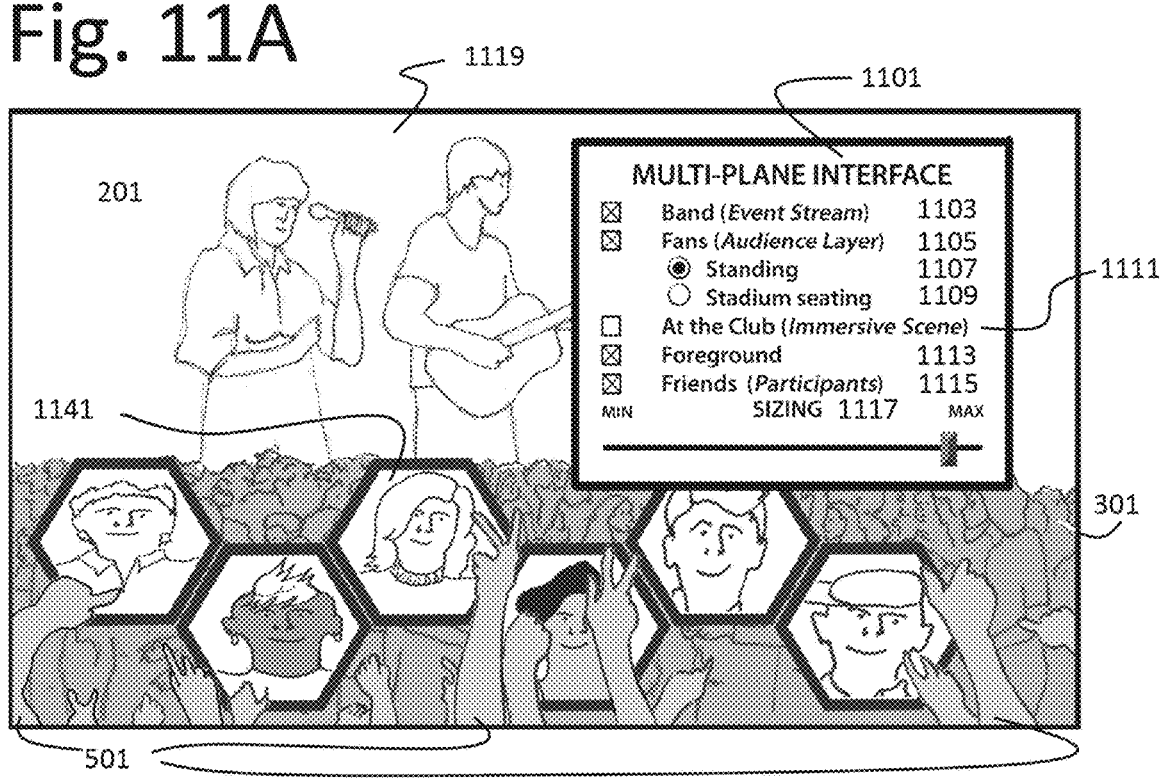
FIG. 11A is a screen shot from a multiplane camera view of a live concert as shown in FIG. 6A, but with a pop-up window to control settings for the different layers, and a change in participant video sizing.
Figure 11B:
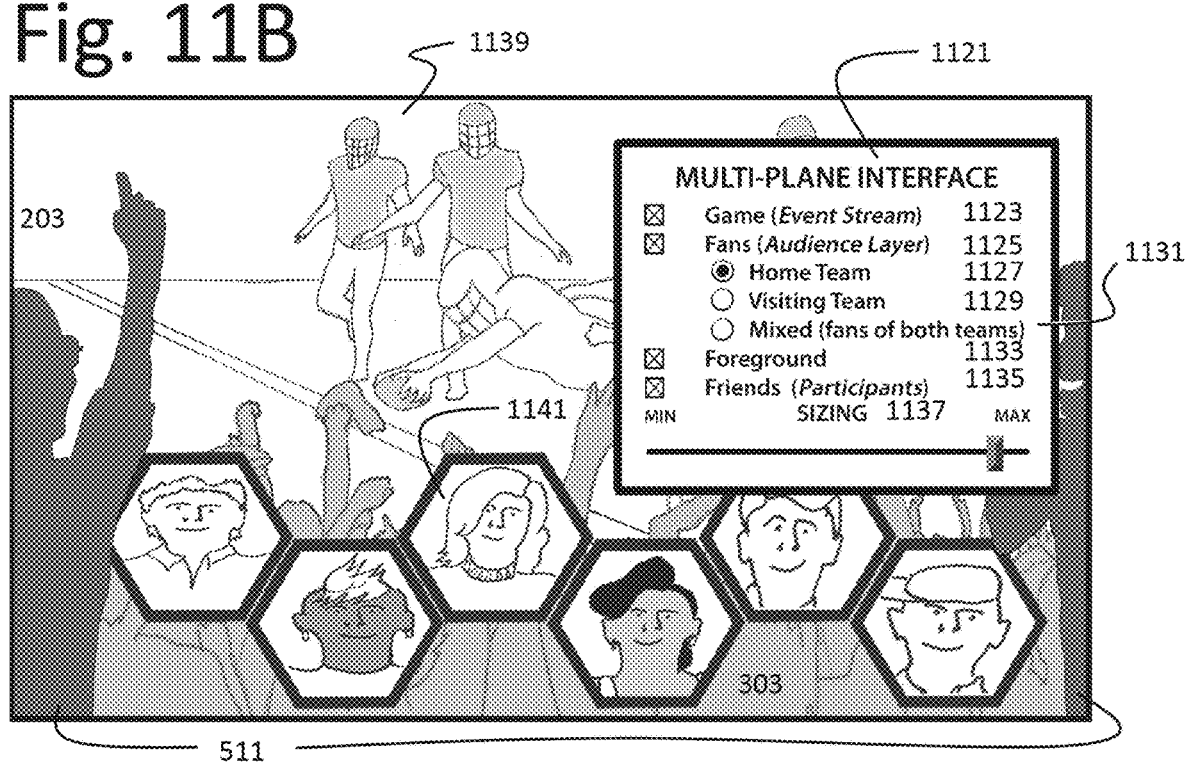
FIG. 11B is a screen shot from a multiplane camera view of a live football game as shown in FIG. 6B, but with a pop-up window to control settings for the different layers, and a change in participant video sizing.

Note, except for FIG. 11A and FIG. 11B these illustrative screenshots do not show program controls, such as task bars, volume controls, program options, etc. or operating system controls. The illustrative screenshots also do not show additional features such as text chat windows, which are displayed in the present invention using methods similar to current practice (prior art). Accordingly, these features are not further illustrated herein.

DETAILED DESCRIPTION OF PREFERRED EMBODIMENTS

Certain terminology is used herein for convenience only and is not to be taken as a limitation on the present invention. The words "a" and "an", as used in the claims and in the corresponding 20 portions of the specification, mean "at least one."

Consider FIG. 1A. FIG. 1A shows the information flows in a videoconferencing system, 105, with a number of participants, only four of which are enumerated (111, 113, 115, and 119), in which the participants are able to share live audio and video of each other (that is, they can see and hear each other electronically), while at the same time the live stream of an event (103) is also provided to these participants in a separate and distinctly displayed, channel. (This is a special instance of the generalized videoconferencing systems discussed in U.S. Pat. No. 11,107,490 (Slotznick) with respect to FIG. 4 and FIG. 5, which are incorporated herein by reference.)

Figure 7A:
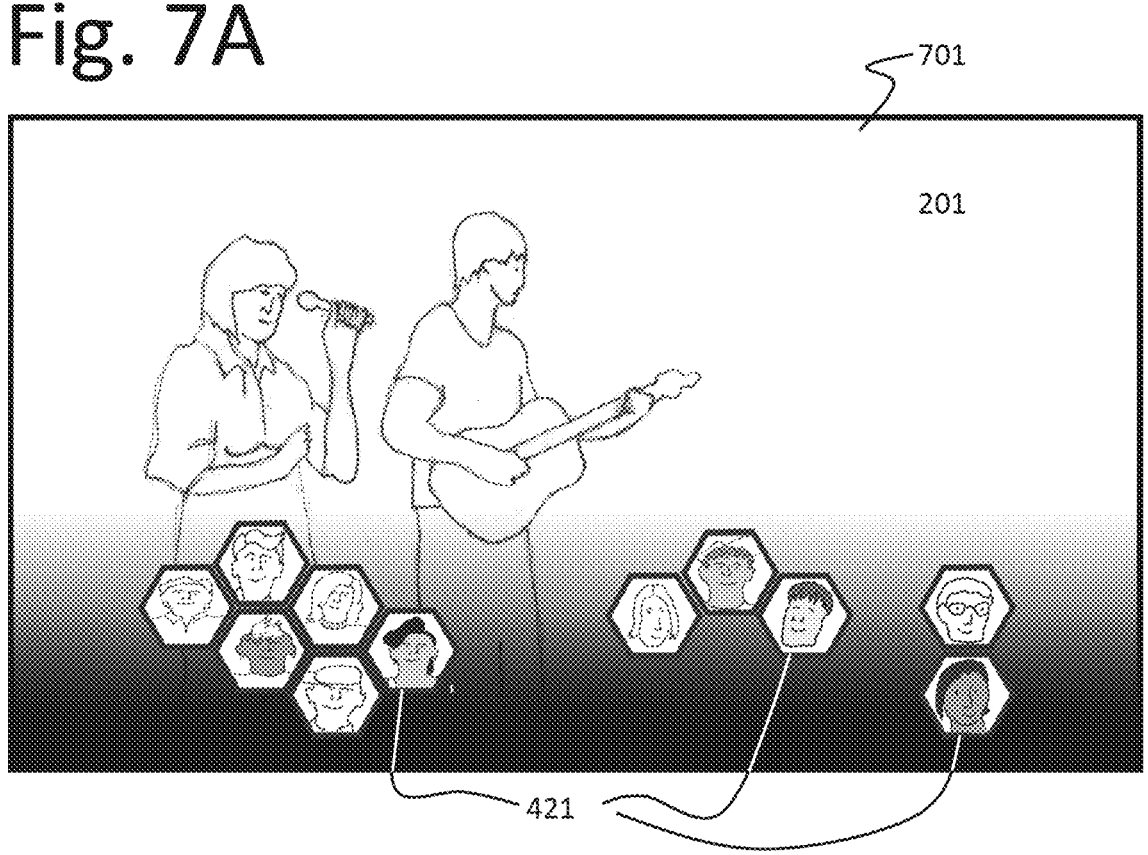
FIG. 7A is a screen shot with just the participant layer overlaying the event stream, as in Flymachine (prior art) and one preferred embodiment of the present invention.
Figure 7B:
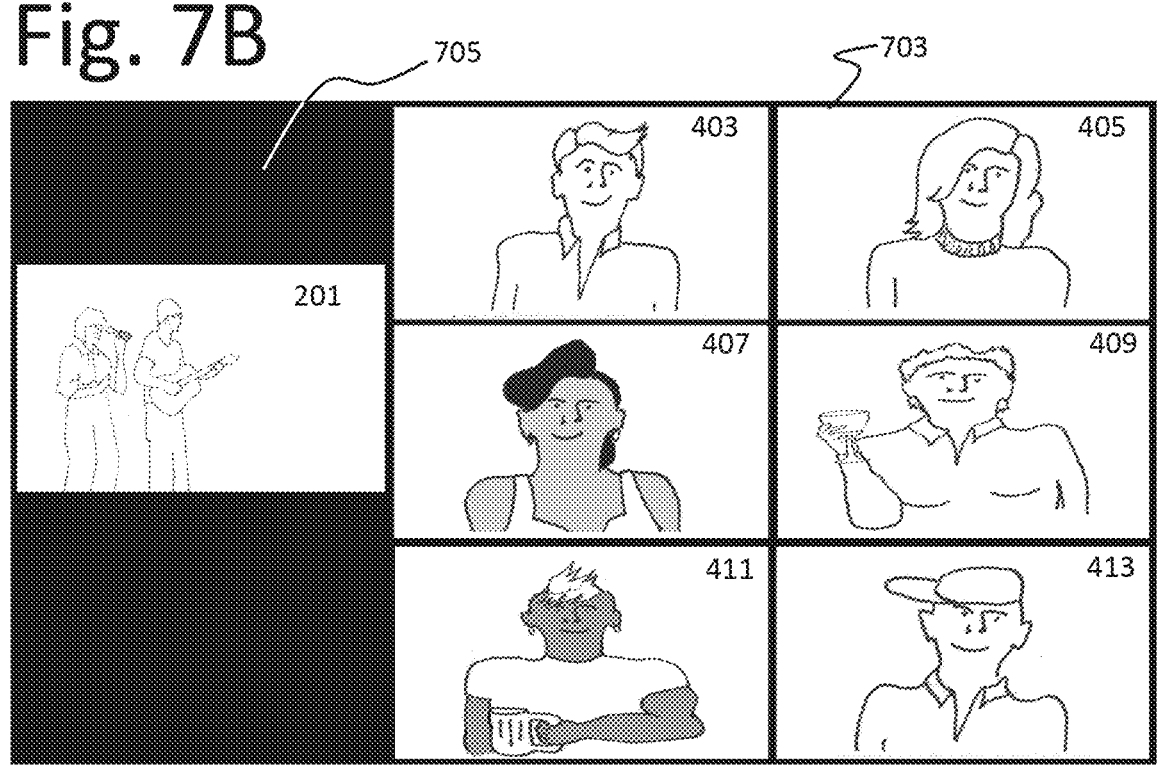
FIG. 7B is a screen shot with a participant layer and a shared screen video, as in Zoom (prior art).

Prior art (such as Zoom) displays this separate stream as a separate section of the application window, for example, when the host shares his or her screen as in FIG. 7B, and the host is viewing a live event over Twitch, YouTube, Facebook Live, Vimeo or other streaming services. The host can also share the video feed from a second camera capturing a live event. Other prior art (such as Flymachine) displays this separate stream as a full screen video underneath the videos of the participants as in FIG. 7A.

Consider the views displayed on the computer screen by prior art before returning to a more complete discussion of FIG. 1A.

Figure 4A:
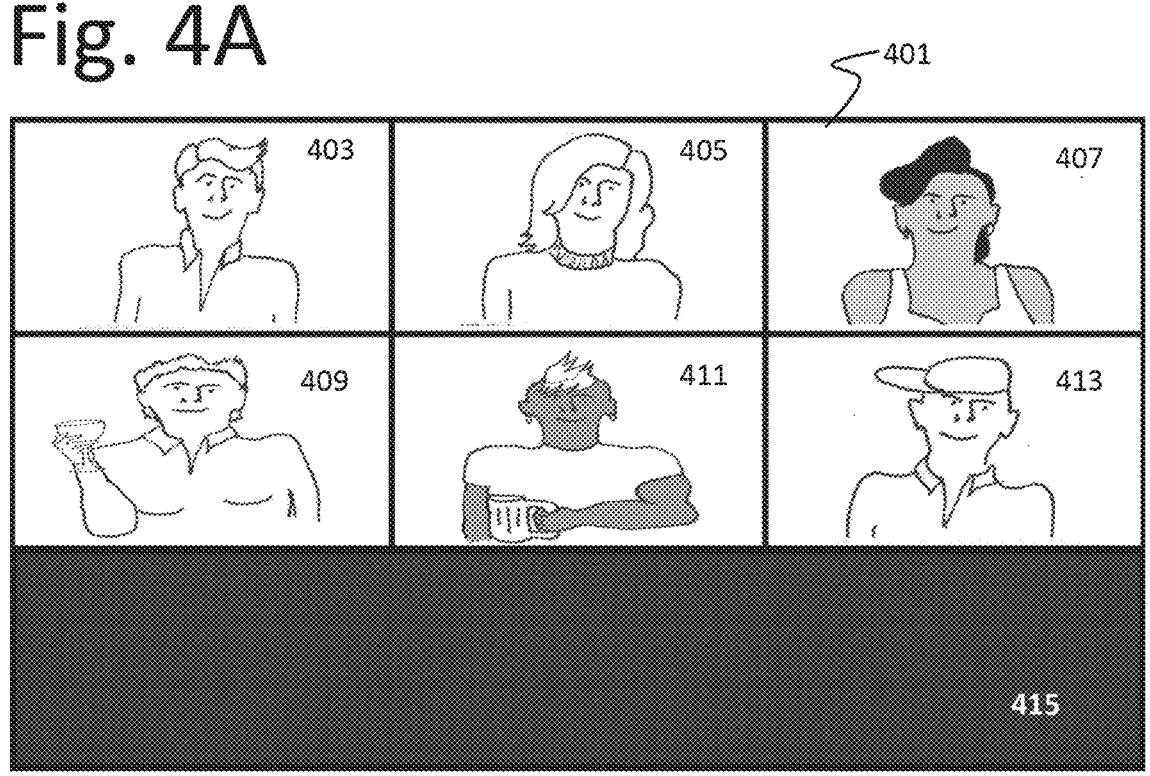
FIG. 4A is a screen shot in gallery view of participants in a videoconference meeting (in prior art).

A primary task of videoconferencing systems is to permit participants in the conference to see and hear each other in virtual meetings or gatherings, as shown in FIG. 4A of this application for six participants 403, 405, 407, 409, 411, and 413. FIG. 4A shows video thumbnails of all participants arranged in a grid in what is often called "gallery view" in the application window 401. As known to those knowledgeable in the art, other views (such as speaker view) and combination views are available, but not shown in the figures. The individual video thumbnails are placed and rendered within the application window 401 by algorithms. (Different videoconferencing platforms use different algorithms to accomplish this.) Some platforms adjust the size and shape of the video thumbnails to fill the entire window. Others, such as Zoom, keep the proportions of the video thumbnails identical and render the remaining unfilled space (415) as black.

Figure 4B:
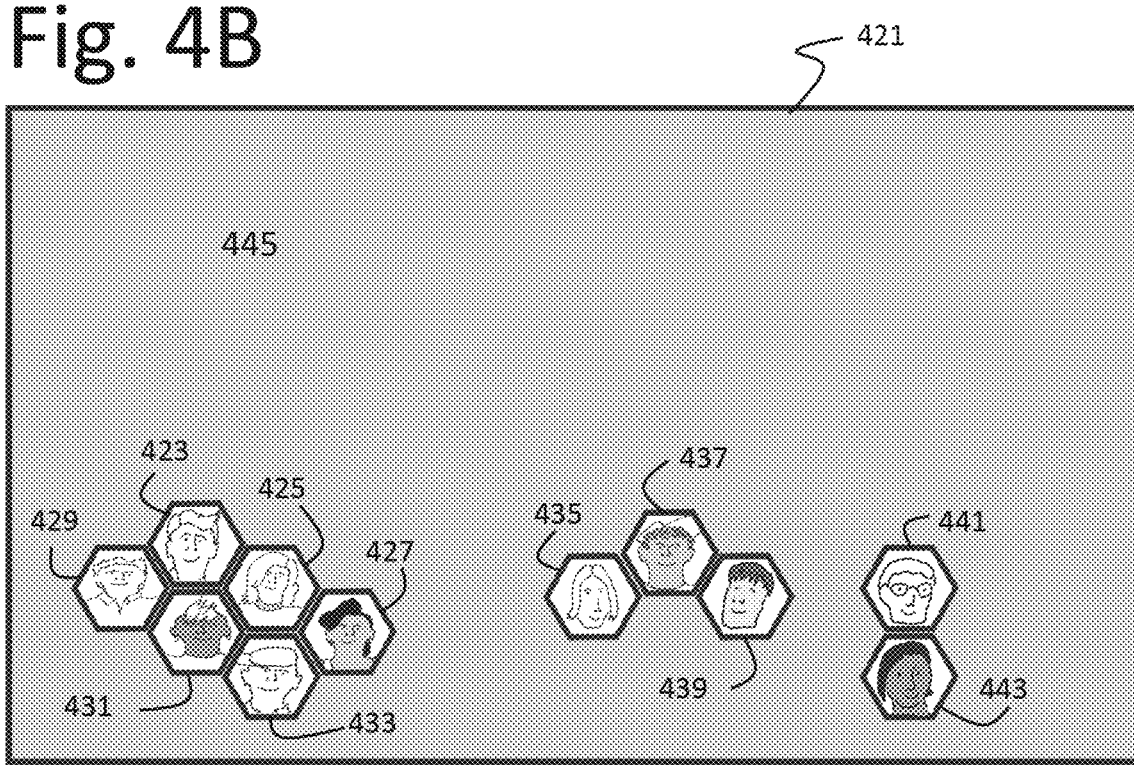
FIG. 4B is a screen shot of the participant layer in as used in Flymachine (prior art) and one preferred embodiment of the present invention.

In contrast, other videoconferencing platforms with conversational groupings based on spatial and proximity clustering schema within the virtual space have participant thumbnail icons (Wonder and Gatherly), avatars (Gather), or videos (Flymachine) float in a layer, with space between them. Users move their icons, avatars, or videos within the layer using drag and drop. When icons, avatars, or videos touch (or come within an epsilon distance of each other) the platform treats them as a cluster for sharing audio (and/or video). In some applications (such as Flymachine), the shape of the icon changes when participant videos touch. In others, a circle is drawn on the screen around them. FIG. 4B shows such a schema (similar to the look of Flymachine). Participants 423, 425, 427, 429, 431, and 433 are in one group (sometimes called a circle or cluster). Participants 435, 437, and 439 are in another group. Participants 441, and 443 are in yet another group. In some platforms, the remaining space in the application frame, 445, is a color or graphic (Wonder and Gatherly). In others it is transparent (as in Flymachine). Different platforms have different limits on how participant videos are displayed, and how many can be in one group.

FIG. 4A and FIG. 4B show and contrast how two different platforms differently display videos of some of the same participants. FIG. 4A is similar to Zoom. FIG. 4B is similar to Flymachine. Participant 403 in FIG. 4A is the same as Participant 423 in FIG. 4B. Participant 405 in FIG. 4A is the same as Participant 425 in FIG. 4B. Participant 407 in FIG. 4A is the same as Participant 427 in FIG. 4B. Participant 409 in FIG. 4A is the same as Participant 429 in FIG. 4B. Participant 411 in FIG. 4A is the same as Participant 431 in FIG. 4B. Participant 413 in FIG. 4A is the same as Participant 433 in FIG. 4B.

Figure 2A:
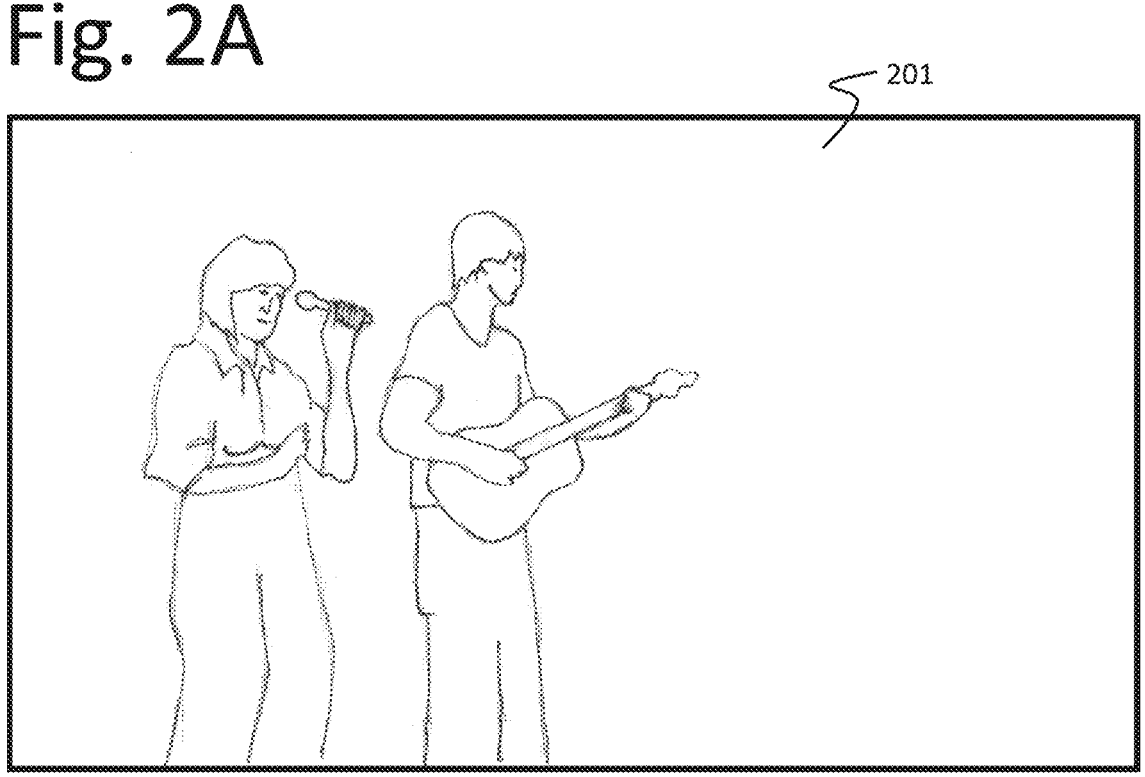
FIG. 2A is a screen shot of a frame from the event stream of a live concert.

Before returning to FIG. 7B, consider first FIG. 2A, which shows a video of two singers performing. The video fills application window 201.

Another task of videoconferencing systems is to allow the host (and sometimes other participants) to share views of pictures, documents, videos, presentations, etc. with other participants on the meeting. These are often called "share screen" features. FIG. 7B shows one way in which a share screen can be displayed. (FIG. 7B illustrates the "side-by-side" view of Zoom's share screen, but Zoom and other platforms have variations of share screen layout). FIG. 7B shows the same six participants, as shown in FIG. 4A, but with a portion of the application window (portion 705 of the whole window 703) being used to accommodate the shared screen (201).

In side-by-side view, Zoom allows each participant to decide—within limits—how much of the application window 703 is dedicated to the shared screen window (703) displaying the shared screen (201), and how much is dedicated to the gallery view of participants, 403, 405, 407, 409, 411, and 413. Note that the arrangement of the participant videos is different in FIG. 4A and FIG. 7B (and could be different in other platforms). This difference is due to the shape of the space in which they are to be displayed, and is determined by Zoom's algorithm for such processes.

FIG. 7B illustrates approximately how it would look for a host on Zoom to use the screen share feature to showcase a live event being livestreamed over Facebook Live, YouTube, Vimeo or another streaming website, application, or service.

Another way in which prior art has presented a livestream of a live event to a group of people in a videoconference is shown in FIG. 7A. FIG. 7A illustrates approximately how such an arrangement looks on Flymachine. Here the participant videos are overlaid on the event live stream video 201. Alternately and more specifically, within application window 701, the participant layer 421 (see also 421 of FIG. 4B) is placed over the streaming event layer 201 before being electronically rendered.

Zoom can also be used to present a livestream of a live event in a way that looks somewhat similar to Flymachine, using Zoom's Immersive View with the My Video variation, plus a virtual webcam such as ManyCam or OBS (Open Broadcaster Software). First the host uses ManyCam or OBS to set up his or her virtual camera to fill the application window (or scene) with the video from the livestream source. Then the host has to designate this virtual camera as the host's video source for Zoom. Then the host chooses Immersive View, and within that view chooses My Video as the scene. The host then has to place other participants within the displayed livestream. Some differences between this use of Zoom and the Flymachine set up are that in Zoom, the backgrounds of individual participant videos will be cut out. Also, individual participants cannot drag and drop their videos. Only the host can do that. Nonetheless, this is another method in which prior art can present a livestream with participant videos laid over it.

Returning now to FIG. 1A. Consider the video information flows in the videoconferencing system, 105, between participants, exemplified by 111, 113, 115, and 117. The webcam of each participant sends video through the transmission system, 101, to the participant video subsystem, 109, of the videoconferencing platform, 105. Participants also send audio, text messages, emojis, and control messages to the videoconferencing platform, 105, but this non-image information flow is not specifically shown in the illustration.

At the same time, the participant video subsystem, 109, of the videoconferencing platform, 105 is sending copies of each participant video to every other participant. (Note, to conserve bandwidth, some videoconferencing platforms do not send the video of a particular participant back to that participant from 109. Instead, a copy of the video produced by that participant's webcam—copied by the participant's computer—is displayed on that participant's own screen.) The videoconferencing system also transmits audio, text messages, emojis, and control messages that it has received, back to all participants. Even though the underlying nature of this information is not image based, this information is displayed as images on the screens of the various participants.

These information flows are used to display participant videos as shown in FIG. 4A and FIG. 4B.

In addition, the platform shown in FIG. 1A, streams live video (such as shown in FIG. 2A) from a live event, 103, via its own separate stream through the videoconferencing platform, 105, via the transmission system, 101, to the virtual livestream subsystem, 107. For some platforms, this livestream is sent, as is, through the transmission system, 101, to the videoconference participants, 111, 113, 115, and 119. At each participant's computer, the videoconferencing system displays the live stream and participant videos, in various ways, such as (but not limited to) 201 of FIG. 2A, 701 of FIG. 7A, or 703 of FIG. 7B.

Alternatively, operators of current (prior art) systems have several different camera operators at the live event, 103. Each camera sends a live video feed to a livestream control subsystem. Using the livestream control subsystem, a webcast engineer, 123 (similar to a broadcast engineer), choses which video stream to send out to participants (111, 113, 115, 119). The webcast engineer has the ability to switch streams by using cross-fade effects, or even overlay the streams. (See for example techniques used by ManyCam and OBS software). Some event producers locate the livestream control subsystem at the live event location, 103. Others locate it within the videoconferencing platform, 107, or even elsewhere such as on the webcast engineer's computer (123) or an auxiliary studio (121). For example, a number of consulting studios offer remote webcast engineer services for multi-camera church service livestreaming.

Skilled webcast engineers (123) know how to mix pre-recorded images and videos into the livestream. (Again, see documentation for products and applications such as ManyCam and OBS.) These additional resources are stored on the videoconferencing platform (105), on the webcast engineer's computer (123) or elsewhere.

For some events, another studio or several studios (such as the auxiliary studio, 121 noted in FIG. 1A) produce other live video streams which the webcast engineer (123) mixes with the video(s) from the live event (103) via the virtual livestream control subsystem (107). The videoconferencing platform (105) sends the resulting mixed livestream to participants (111, 113, 115, 119). Without loss of generality, for a more complicated production, more than one webcast engineer works in concert, and these webcast engineers are located at various places, including at the live event, any auxiliary studio(s) or elsewhere.

Figure 1B:
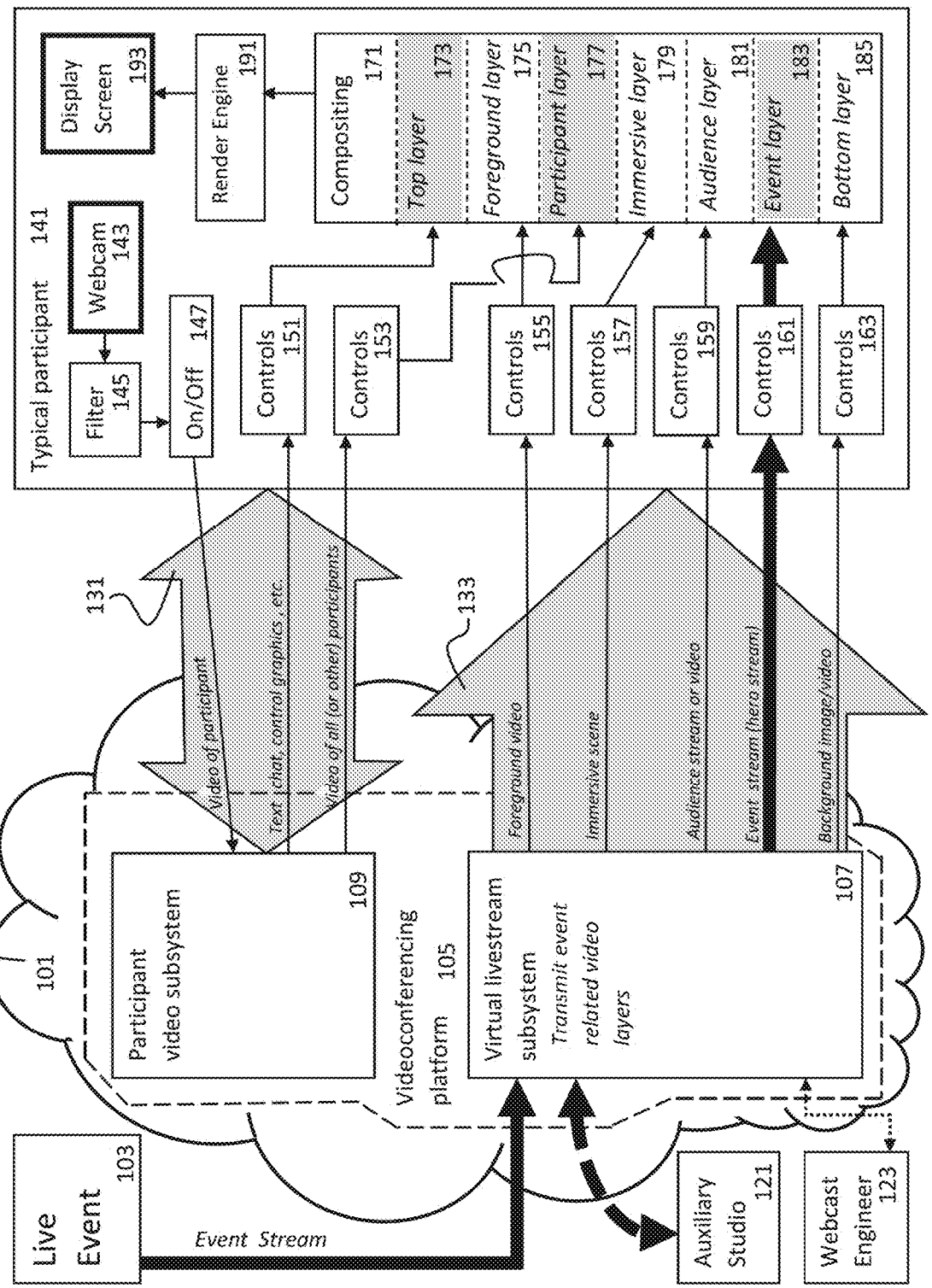
FIG. 1B is a detailed view of parts of FIG. 1A, in one preferred embodiment of the present invention, illustrating differences from prior art.

Consider now FIG. 1B (and FIG. 1C), which provide a more detailed view of parts of FIG. 1A. In particular FIG. 1B shows the information flows from the videoconferencing platform (105) to a typical participant (141 in FIG. 1B) which could be any one of the participants in FIG. 1A (111, 113, 115, 119).

The two-way information runs from the participant video subsystem (109) through the transmission system (101), to the individual participants (111, 113, 115, 119). This is shown in FIG. 1A as thin single lines with arrow heads going both directions. More detail of these information flows is shown on FIG. 1B as a thick lightly-greyed double-headed arrow (131). However, three individual information flows that are part of 131 are also shown in FIG. 1B: (a) video from the participant, (b) videos of participants going to each participant, and (c) other non-video information such as text chat, which is available to be visually displayed on each participant's computer. Current systems (prior art) employ all these three information streams.

The one-way information flows from the livestream video subsystem (107) to the individual participants are shown in FIG. 1A as a thick multi-headed but one-way arrow, carrying livestream information from 107 to each participant (111, 113, 115, 119) via the transmission system (101). More detail is shown on FIG. 1B as 133, again a greyed-in one-way arrow, but with detailing of a number of typical specific information flows that go to the typical participant 141. Five separate flows are shown in FIG. 1B (though alternate embodiments of the present invention may have more or different flows). Each of these information flows is separately controllable by the participant 141. Importantly, prior art employs only one of these information flows.

Within FIG. 1B, while a participant (141) is taking part in a videoconference, a video of the participant (141) is taken by his or her webcam (143). Some hardware, virtual camera applications and videoconferencing platforms filter the image (145) before the image is transmitted to the video subsystem (109) of the videoconference platform (105).

In this disclosure, the term "filter" includes the insertion of virtual backgrounds, picture in picture, overlays, decorative frames, zoom filters, virtual objects that follow and overlay the participant's face or body (such as virtual hats, mustaches, Mardi Gras masks), virtual make up, skins (such as virtual tattoos and virtual clothing), lenses (a term used in Snap Camera for its various AR effects), lower thirds, effects such as a flock of flying butterflies or sparks that appear to shoot from the participant's fingers, mirroring, resizing, reframing, and in general the alteration of the video image captured by the webcam in any or all of the ways known to those skilled in the art. Some instances of such filters and filtering are found in (but are not limited to) ManyCam, Snap Camera, Zoom, and OBS.

In many videoconferencing platforms, the participant (141) is given the option to turn his or her image, on or off (147). That is, the participant chooses whether to send the video that is captured by the webcam to the videoconference platform (105), via the transmission system (101), or participate only in the audio of the videoconference—without the live image from his or her webcam being shown. This is a common feature of current videoconference systems. When a participant's video is not sent, the videoconference system often substitutes a black screen with the participant's name or initials, or thumbnail image of the participant.

The participant video subsystem (109) of the videoconferencing platform (105) receives the webcam video by way of the transmission system (101). The videoconferencing platform processes the received images (in ways depending on the platform), before transmitting those videos to other participants. The varying methods of such processing are known to those skilled in the art, and are not shown in FIG. 1B. The participant video subsystem (109) then transmits the video streams received from each participant through the transmissions system (101) to all of the participants (e.g. 111, 113, 115 and 119 in FIG. 1A, or 141 in FIG. 1B), where they are processed by participant controls (153).

Note, in some videoconferencing systems, in order to conserve bandwidth, the webcam video from a specific participant (141) is not only sent to the participant video subsystem (109), but (a) is also processed at the participant's computer through any controls (153), compositing (171), and rendering (191) in order to be displayed on the participant's display screen (193), so that the participant video subsystem (109) does not need to (b) use system transmission bandwidth to send the video back to the participant. With such an arrangement, each participant only receives the videos from all other participants. In contrast, other videoconferencing systems send all participant videos to all participants.

The participant controls (153) for participant video streams include (but are not limited to) choosing gallery view or speaker view, and "pinning" specific user videos, "spotlighting" specific user videos, repositioning participant video thumbnails, expanding the gallery view, specifying the size of the application window (which will affect video size) and other user choices and interactions well known to those skilled in the art. As known to those skilled in the art, different videoconferencing systems have enabled different ways in which users control aspects of the participant video streams that they receive. After a participant makes his or her choices, the video streams are sized, arranged, and layered (177) in a compositing process (171), after which they are processed by a rendering engine (191) and displayed on the participant's display screen (193).

(Videoconferencing systems also involve the flow and exchange of audio data, and participants have control over some of this. However, because the present invention focuses on the image and video layers of a multiplane camera view, the audio data flows are not shown.)

In addition to the video feeds captured by webcams, participants also send non-image data through the transmission system (101) to the videoconference platform (105), including text chat, emojis, and various other information, known by those skilled in the art. This is non-image data, so not shown in FIG. 1B. However, the videoconferencing platform must still send this information (along with instructions for displaying this data) to each participant for display on that participant's display screen. Consequently FIG. 1B shows this as a data flow from the participant video subsystem (109) through the transmission system (101) to participant (141) to be processed by controls 151.

Videoconference systems generally allow individual participants to decide whether to display group text chat, participant lists, question and answer postings, and other matters. They sometimes allow participants to decide how such information is displayed, for example, within the application window, or in a pop-out window. Different videoconference platforms allow participants different types of control over the display of this non-image data. These varying aspects controlled by 151 are well known to those skilled in the art, and will not be enumerated.

After participant 141 adjusts controls 151, the data is prepared for display, then sized, arranged, and layered in a compositing process (177), after which the data are processed by a rendering engine (191) and displayed on the participant's display screen (193). Such data are generally displayed (when they are displayed) as contained either in its own window, in a pop-up window, or in the top layer of the screen as rendered (173). That is, when displayed, other images and data do not cover them. More specifically, the participant videos are rendered either on a lower layer (177) than the text chat (appearing underneath them), or within in its own container or a separate window.

Absent a separate and distinct event stream, the description above describes in general how participant videos are handled by both current practice (prior art) and the present invention. Novel aspects of the present invention relate to how aspects related to an event livestream are handled, displayed, and layered with respect to the event stream and the participant videos.

Consider now a simple event stream as shown in FIG. 1B. As noted above, the Flymachine platform features an event stream with separate audio and video, with the video displayed on user's screens either by itself, or in a layer underneath participant videos (and underneath data such as text chat). Flymachine's event stream also carries separate—and separately controllable—audio, so that users can talk to each other while listening to the event stream. (Apple's new SharePlay includes such audio mixing controls that bridge FaceTime videoconferencing and separate audio-video applications that a group of people might watch or listen to together.)

With some videoconferencing platforms, the video of a separate live event stream is only able to be displayed within the application using the shared screen feature, though the stream's audio is not separately processed and adjusted. (Of course, existing videoconference systems can incorporate a live event stream as if it were just another participant, but this not only limits the visual immersion of the participants in the event—it also limits the possible participant audio interaction during the event.)

In FIG. 1B, the event stream is created at a live event (103), sent over the transmission system (101) to the videoconferencing platform (105). The event stream undergoes processing in the livestream subsystem (107), after which it is transmitted through the transmission system (101) to each participant (141), where it is pre-processed in the context of participant selected controls (161). The controls, 161, include not only resizing the application window, which will affect the size and resolution at which the event stream is displayed, but also turning the video stream on or off, while still listening to the audio. However, as known to those skilled in the art, such participant regulated controls (as discussed above with respect to 151 and 153) take a variety of forms and dictate a number of different possible aspects of the display of the event stream.

The event stream is then composited (171), rendered (191), and displayed on the participant's screen (193). In the compositing process (171), both current videoconference platforms (prior art) and the present invention place the event layer (183) beneath the participant layer (177), and the top layer (171, with its display of information such as text chat). (As noted above, some current systems place the event stream in a separate container from the container holding participant videos and the container holding information such as text chat.) Layer's 173, 177, and 183 are shaded light grey in FIG. 1B to easily identify prior art layering. Other layers are absent from prior art.

Consider now the present invention and the information streams for the additional visual layers taught by it. Information sources include streaming live video, pre-recorded video, images, animations, or visual media with embedded positional or time information. They are produced at the live event (103) or an auxiliary studio (121) and streamed separately over the transmission system (101) to the livestream subsystem (107) of the videoconferencing platform (105). Pre-recorded and pre-produced visual material are stored at the live event (103), the auxiliary studio (121), on the webcast engineer's computer (123) in the cloud of the videoconferencing platform (105), or elsewhere. In any event, the webcast engineer (128) chooses which visual material goes into each stream sent from the livestream subsystem (107) over the transmission system (101) to each participant (141).

The participant (141) has some control over each such stream (see controls 155, 157, 159, 161, 163 discussed in exemplary detail below). As discussed above with respect to controls 151 and 153, these controls take many forms and effect many display functions and aspects. FIG. 1B shows five streams being sent: (a) a background image or video through control 163 to the bottom layer (185) in the compositing process (171), (b) the event stream (or hero stream) through control 161 to the event layer (183) in compositing (171), (c) the audience stream through control 159 to the audience layer (181) in compositing (171), (d) the immersive visual scene through control 157 to the immersive layer 179 in compositing (171), and (e) the foreground visuals through control 155 to the foreground layer (175) in compositing. A particular embodiment may include more or fewer streams and more or fewer stream layers.

Notice particularly that the visuals in the foreground layer (175) overlay the participant videos in the participant layer (177). This multiplane layering, with the participant layer in the midst, provides the enveloping three-dimensional aspect of the multiplane camera view.

By choosing which layers to turn on (and which to turn off), the participant chooses the degree of three-dimensionality and intimacy of his or her experience. Is the participant listening to a concert leisurely while talking with friends, or surrounded by bodies in the middle of the dance floor? The participant can simulate experiencing a concert (or sporting event) from the front row, the back row, or the middle of the audience. The reason this is important for creating an immersive effect is not only to enhance visual connectivity, but because it can increase the immediacy and emotional energy of experiencing an event, imbuing the experience with what some sociologists such as Randall Collins and Emile Durkheim refer to as collective effervescence. Neuroscientists have found physical effects associated with such group interactions. When a person sings, dances, cheers, shouts, and moves together with others in a crowd, neurotransmitters including oxytocin, serotonin, and dopamine are produced in the person's brain, providing an intense, pleasurable and emotive bonding response. For singing, see https://www.frontiersin.org/articles/10.3389/fnhum 0.2015.00518/full and https://www.cbc.ca/radio/blogs/the-science-behind-why-choir-singing-is-good-for-you-1.4594292. For music and dance see https://www.frontiersin.org/articles/10.3389/fnhum.2020.00350/full. For watching sports see https://www.nbcnews.com/better/health/what-happens-your-body-brain-when-you-watch-football-ncna814401. The visual aspect of the present invention's multiplane camera view helps trigger the kinds of reactions which television viewers experience when they watch their team win Super Bowl.

Consider now some features of the included figures illustrating sample layers.

Figure 3A:
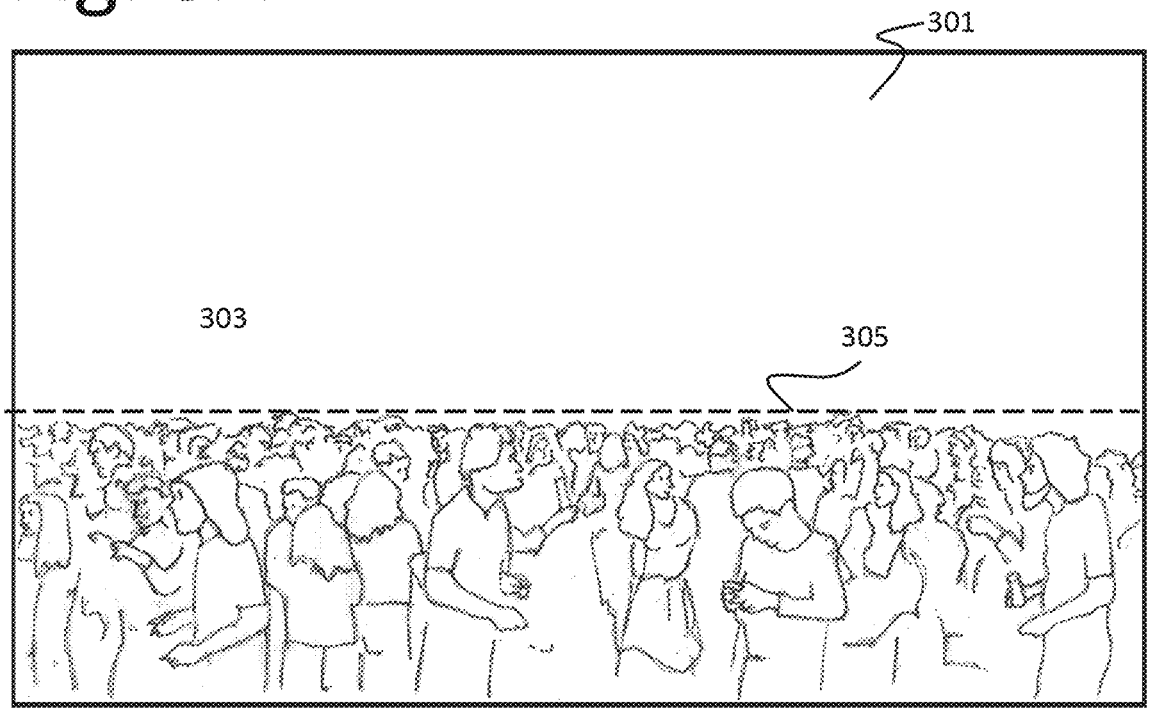
FIG. 3A is a screen shot of a frame from the video used in the audience layer for a live concert.
Figure 12A:
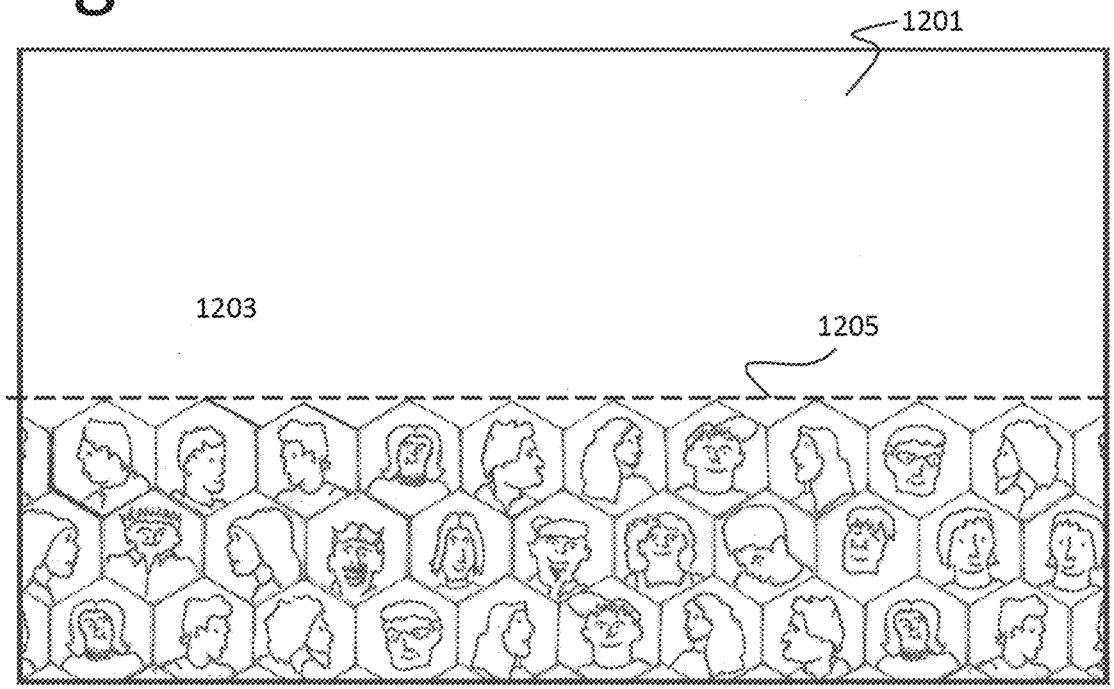
FIG. 12A is a screen shot of the audience layer for a live concert, where the audience layer is formed by compositing the video feeds of other participants attending the concert by way of the videoconferencing platform.

FIG. 3A shows a screenshot of a frame from the video of the audience at a rock concert, 301. People in the audience are dancing to the music. In a preferred embodiment, the upper half of the layer of the screen (portion 303 above line 305) is transparent. In some instances, this is accomplished with augmented reality (AR) software that employs background segmentation, or pixel replacement. Alternatively, this is accomplished by building the audience layer with a transparent sublayer, and overlaying it with the video of the audience that is cropped to dotted line 305. Alternatively, the audience video is shot at an auxiliary studio, 121, in front of a green screen. Alternatively, the audience is a pre-recorded video or animation. Alternatively, such as illustrated in FIG. 12A, the audience layer is a composite video created from the webcam videos of meeting participants. FIG. 12A shows this composited audience layer being created using video feeds displayed within tiled polygons. Alternately these video feeds are displayed within overlapping polygons. An alternate embodiment uses background removal for each video feed and then combines these feeds using video production techniques (including, but not limited to overlaying) known to those skilled in the art, into an audience layer that looks like FIG. 3A. In one preferred embodiment for a large virtual gathering with many participants, only some of whom appear in the participant layer described below (the participants being part of a conversation group or breakout session featured in the participant layer), a composite video of those not appearing in the participant layer is used for the audience layer. Other methods of creating this audience layer are known to those skilled in the art of video production, animation, and augmented reality.

(In an alternative embodiment of the present invention, a user can click on the video feed of a participant shown as an audience member (on a different layer) to send a direct chat message to that person, or to otherwise connect with that person, such as starting a conversation circle or dance together.)

Notice that FIG. 3A (and FIG. 3B) allows a large audience to overlay a studio performance with just musicians, when there is no live audience present. Notice also that most shots of the musicians that include a live audience will show only the backs of the audience. In contrast a separate audience layer can be shot into the audience, showing their faces. In some circumstances, this creates a more engaging effect than just seeing the backs of other audience members.

Figure 3B:
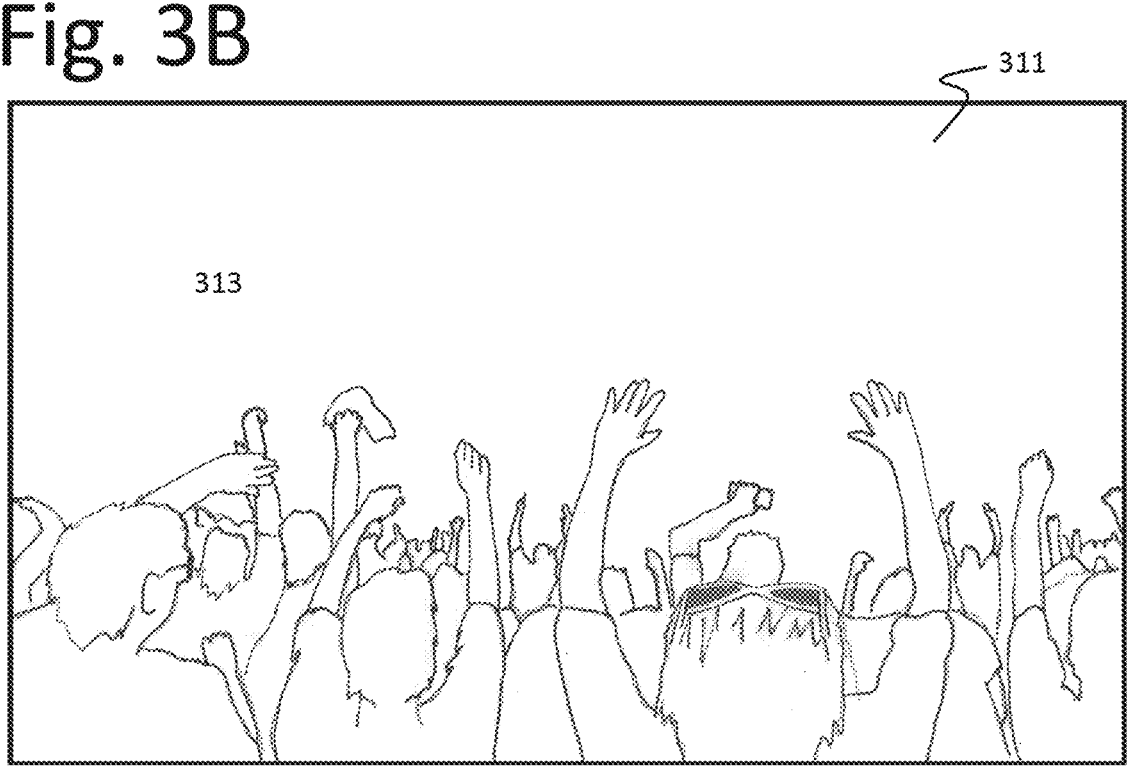
FIG. 3B is a screen shot of a frame from video used in the audience layer for a football game or sporting event.

FIG. 3B shows a screenshot of a frame from the video of the audience (seated in a stadium) at a football game, 311 (or rock concert). From time to time, the audience members jump up and cheer, such as the moment shown in FIG. 3B. In a preferred embodiment, the upper portion of the screen 313 is transparent. Notice that a separate audience layer can be produced for the fans of each team, so that the participants can sit among a virtual audience who will cheer for whom the participants prefer, and cheer when the participants cheer.

Figure 5A:
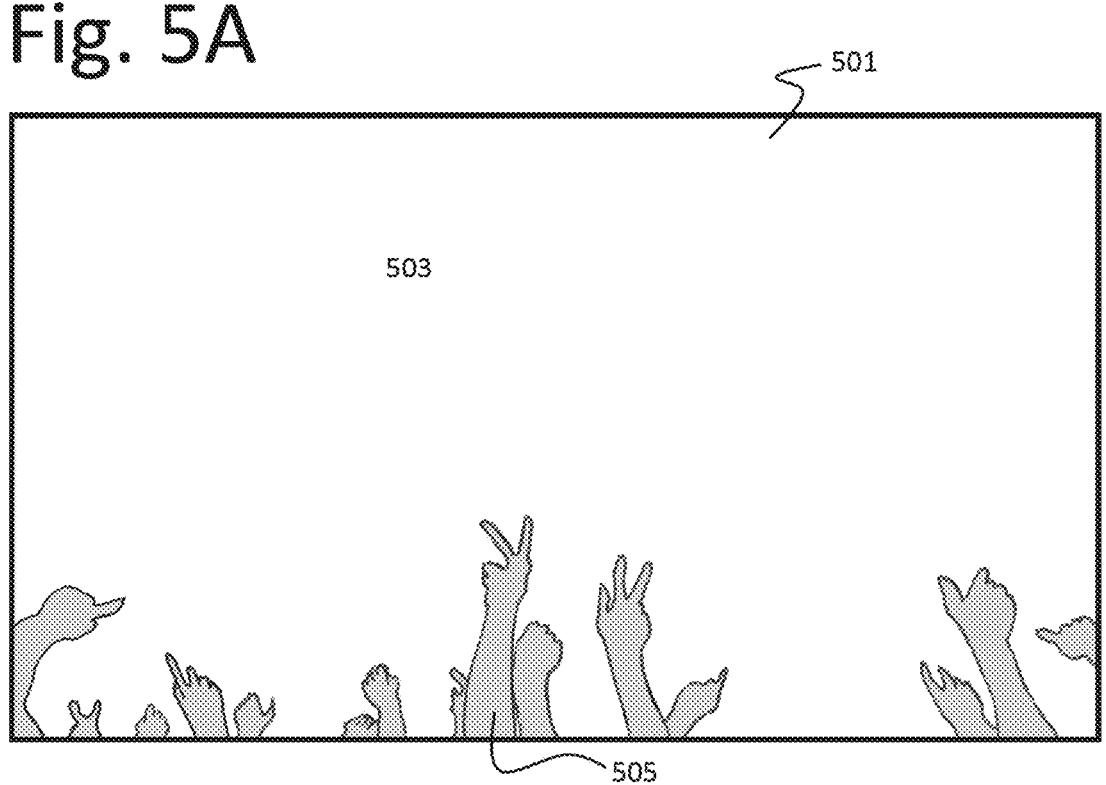
FIG. 5A is a screen shot of a frame from the video of the foreground layer for a live concert.

FIG. 5A shows a screenshot of a frame from one possible foreground video for a rock concert, 501. It shows silhouettes of upper arms 505 of people dancing. The upper portion of the screen, 503, is transparent. For some concerts this layer is a live video. For others, the layer contains a looping animation. Those skilled in the art know additional ways to produce this layer. Audience and foreground layers can be silhouettes, transparencies, or portions of people (e.g., waving hands over heads). Note that handwaving can be recognized by AI converted using body segmentation and AR into a foreground layer.

Figure 5B:
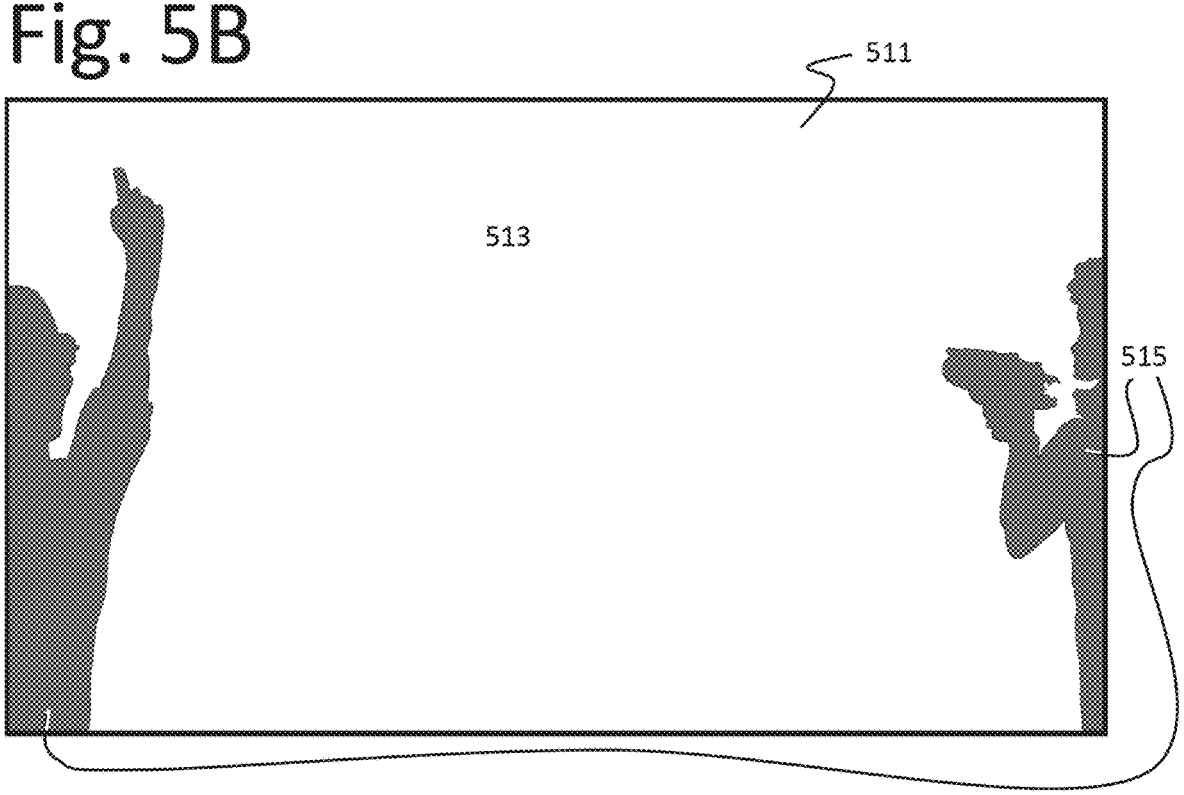
FIG. 5B is a screen shot of a frame from the video of the foreground layer for a football game or sporting event.

FIG. 5B shows a screenshot of a frame from one possible foreground video for a football game, 511. It shows silhouettes, 515, or blurred figures of fans on the edges of the screen, whose images come in and out of the screen and join in some cheers. Much of the screen, 513, is transparent.

Figure 8A:
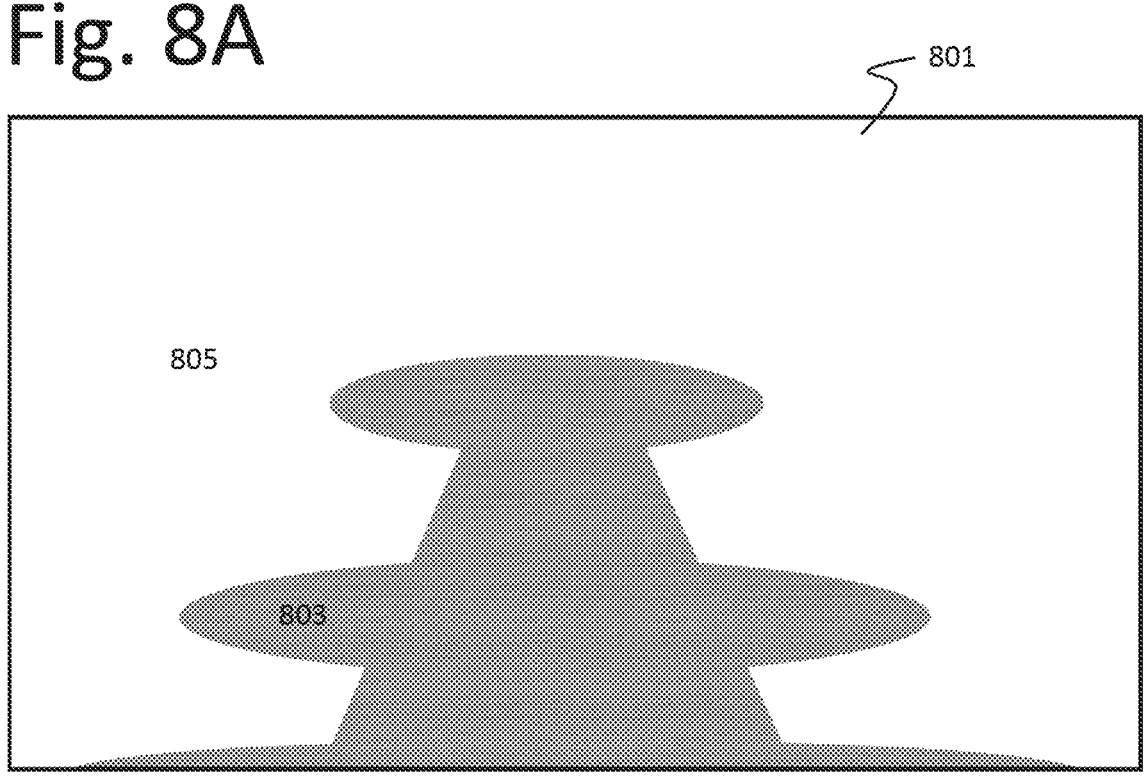
FIG. 8A is a screen shot of an immersive scene of a "table" around which participants can be "seated" (that is around which participant videos can be placed, overlaid, or embedded so that the participants appear to be seated around the table).

FIG. 8A shows a screenshot of the setting for an immersive scene view at a night club, 801. It shows the top of a stylishly shaped table, 803. The rest of the screen, 805, is transparent. Anchor points for participant videos are not shown.

Figure 8B:
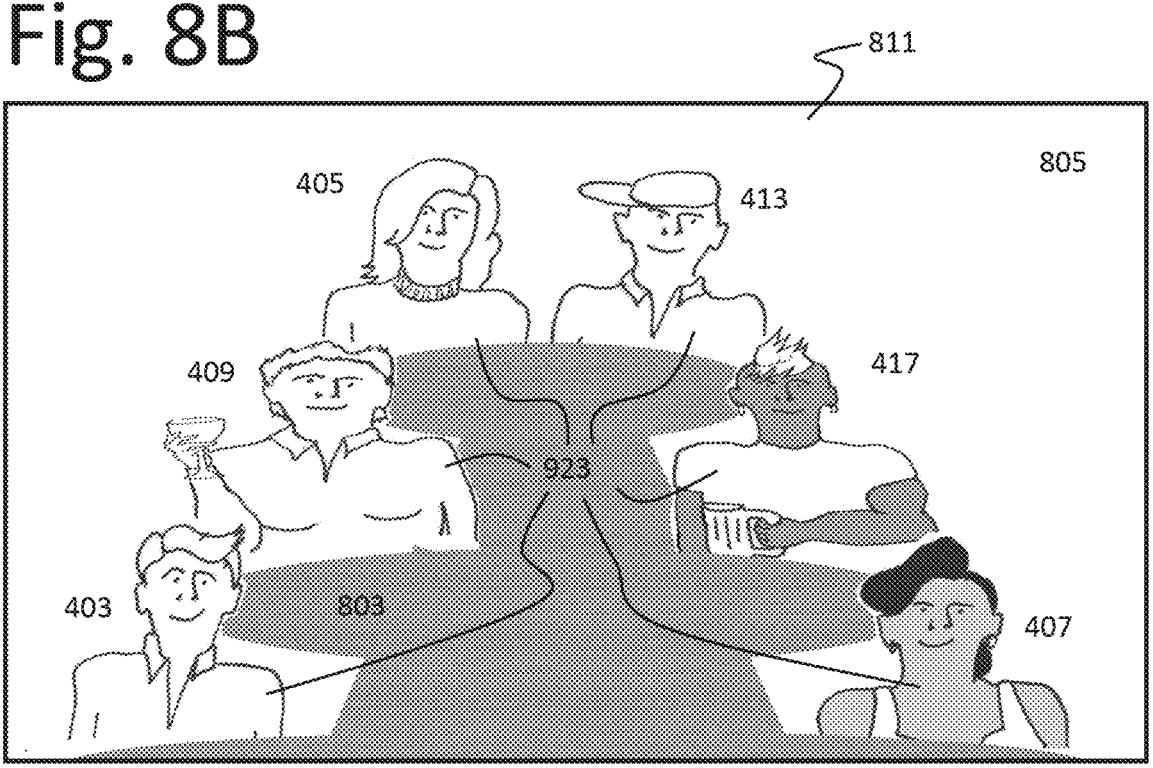
FIG. 8B is a screen shot of six participant videos embedded in (or overlaid on) the immersive scene of FIG. 8A.

FIG. 8B shows FIG. 8A, but with participant layer (FIG. 9C) containing participant videos (403, 405, 407, 409, 413, and 419, collectively labeled 923) overlaid thereon. Notice that the backgrounds of the participant videos have been removed through AR background segmentation. The immersive scene includes anchor points (not separately illustrated or labeled) at the base of each participant video. The immersive scene is automatically populated with participant videos (as Zoom and Microsoft do with their immersive scene views). In an alternative embodiment, the host can place these participant videos in the scene by hand. Alternately, this immersive scene is composed of several layers in the manner of Together Mode, with participant video feeds layered in between the images (or videos) of furniture, props, and other items. See discussion below of "Together Mode."

Figure 9A:
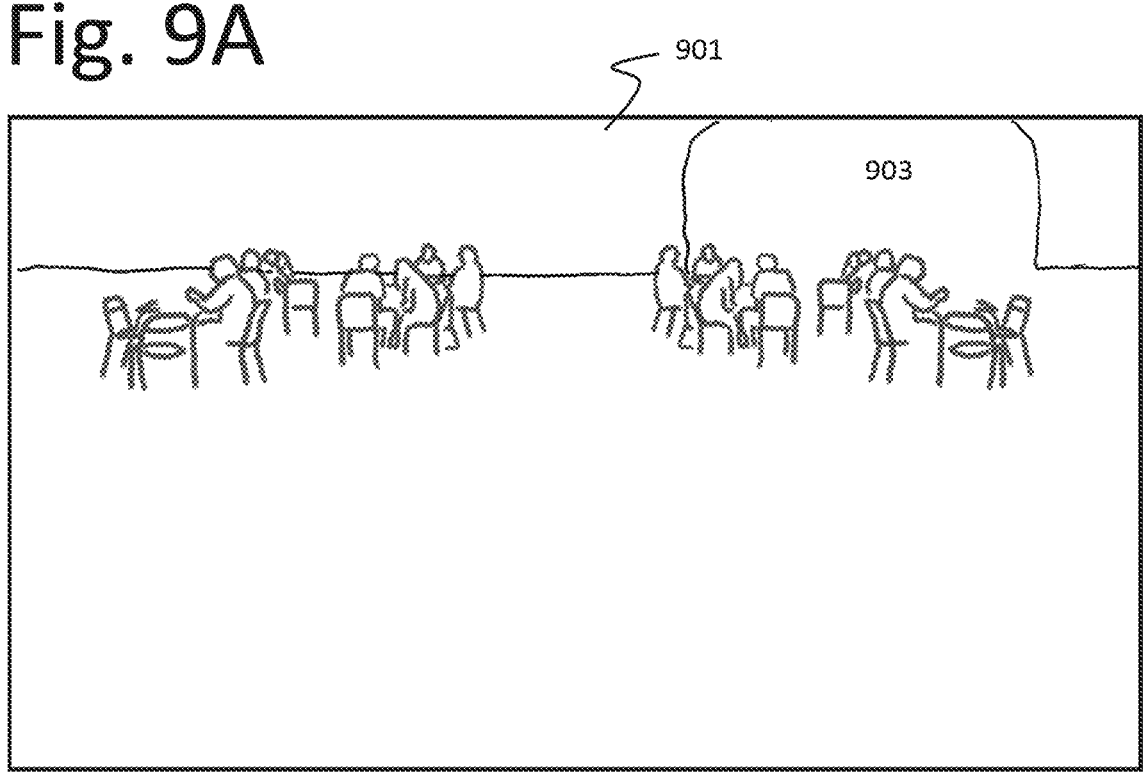
FIG. 9A is a screen shot of a frame from the video used in the audience layer of a night club.

FIG. 9A shows an alternate audience layer at a night club, 901. The area under the arch (903) is transparent.

Figure 9B:
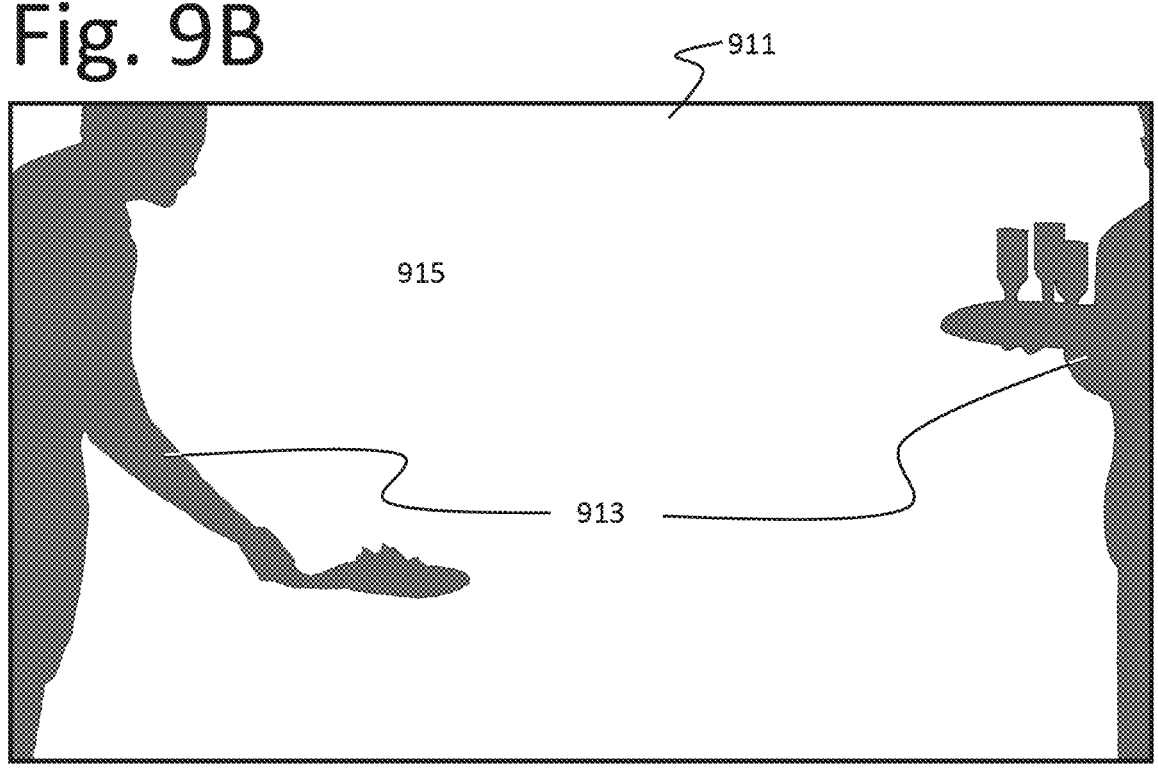
FIG. 9B is a screen shot of a frame from the video used in the foreground layer of a night club.

FIG. 9B shows an alternative foreground layer at a night club, 911. Shown are silhouettes of waiters (913). Their video images appear at the sides of the frame. They pass in and out of the frame and appear to pass by the participants. The rest of the frame (915) is transparent.

Figure 9C:
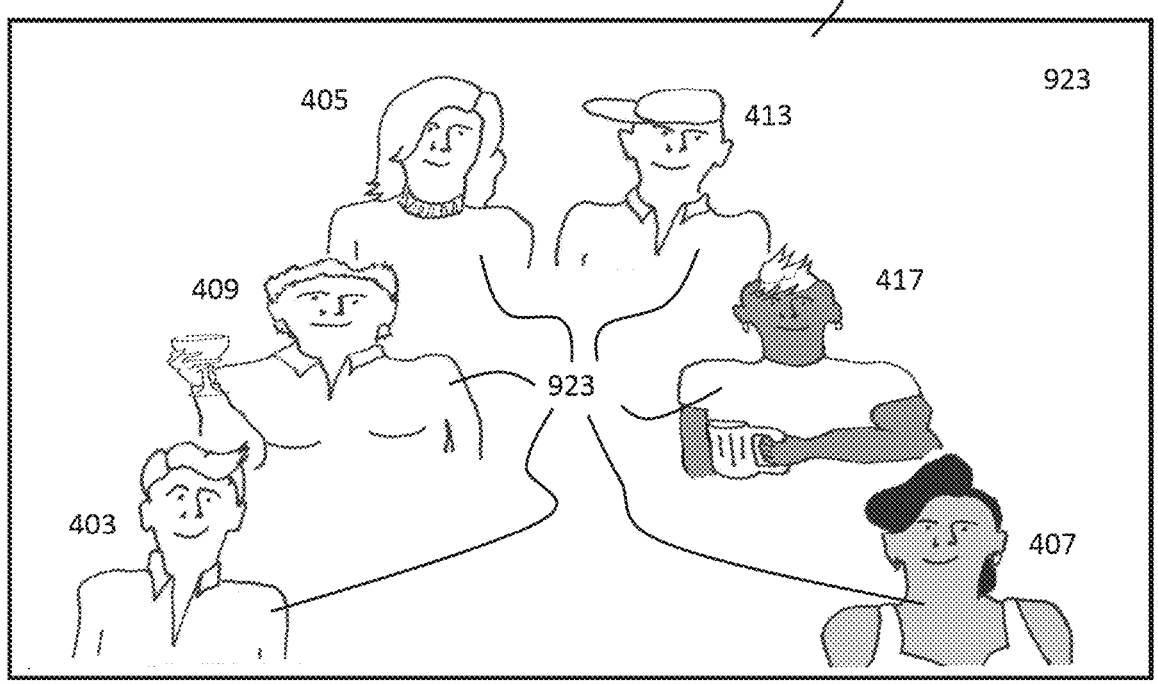
FIG. 9C is a screen shot of the participant layer used in FIG. 8B.

FIG. 9C shows the participant layer for the immersive scene view shown in FIG. 8A. FIG. 9C contains participant videos (403, 405, 407, 409, 413, and 419) collectively labeled 923. In a preferred embodiment, using methods known to those skilled in the art of AR, the size of individual participant heads, bodies and torsos is adjusted to be similar. In an alternate embodiment (not shown), these sizes are not adjusted.

Figure 10:
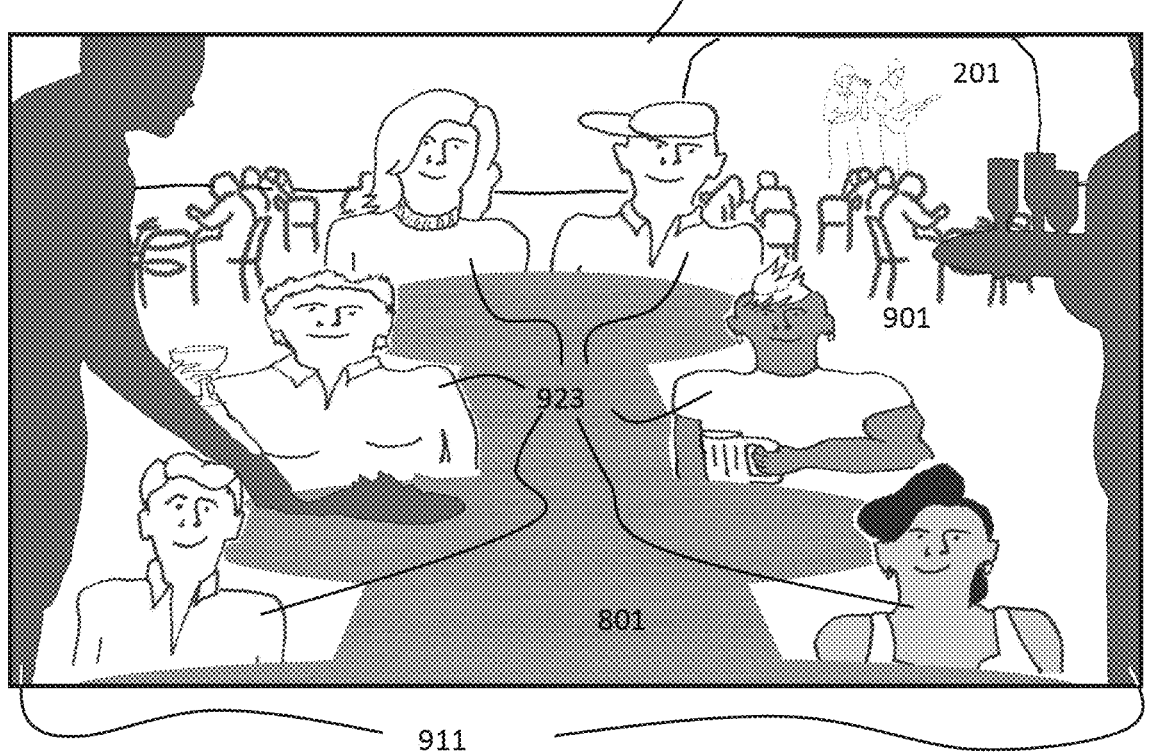
FIG. 10 is a screen shot from a multiplane camera view of participants around the table at a night club, with musicians playing in the event stream layer, plus an audience layer and foreground layer.

FIG. 10 shows what the layers depicted in FIGS. 8A, 8B, 9A, 9B, and 9C look like when combined in a new immersive setting for the event shown in FIG. 2A. FIG. 10 will be referenced in more detail below.

Consider now how controls and filters are implemented in the present invention, using FIG. 11A and FIG. 11B as examples.

Consider the pop-up window 1101 in FIG. 11A. This shows the controls by which a user chooses settings for the layers to be enabled in a multiplane camera view of the rock concert shown in FIG. 2A. Some items are enabled with check boxes (e.g., the event layer, 1103, the audience layer, 1105, the immersive scene, 1111, the foreground layer, 1113, and the participant layer, 1115). Other items use radio buttons, such as the choice between having an audience layer showing (a) concert fans standing and dancing, 1107, or (b) concert fans seated in stadium seating, 1109. (Concert fans in stadium seating appear similar to the audience layer shown in FIG. 3B.) Still other items are controlled by a slider, such as the control for the sizing of participant videos, 1117 of FIG. 11A. Still other types of controls, such as, but not limited to, list boxes, buttons, toggle switches, drop-down lists, color pickers, combo boxes, pie menus, image maps, and other controls as known to those skilled in the art are employed when appropriate.

In some cases, enabling one option (such as the immersive scene, 1111), sets other items, such as the specific audience layer (people seated at the club), as well as size and positioning of participants. When that is the case, other choices disappear or become greyed out.

Figure 2B:
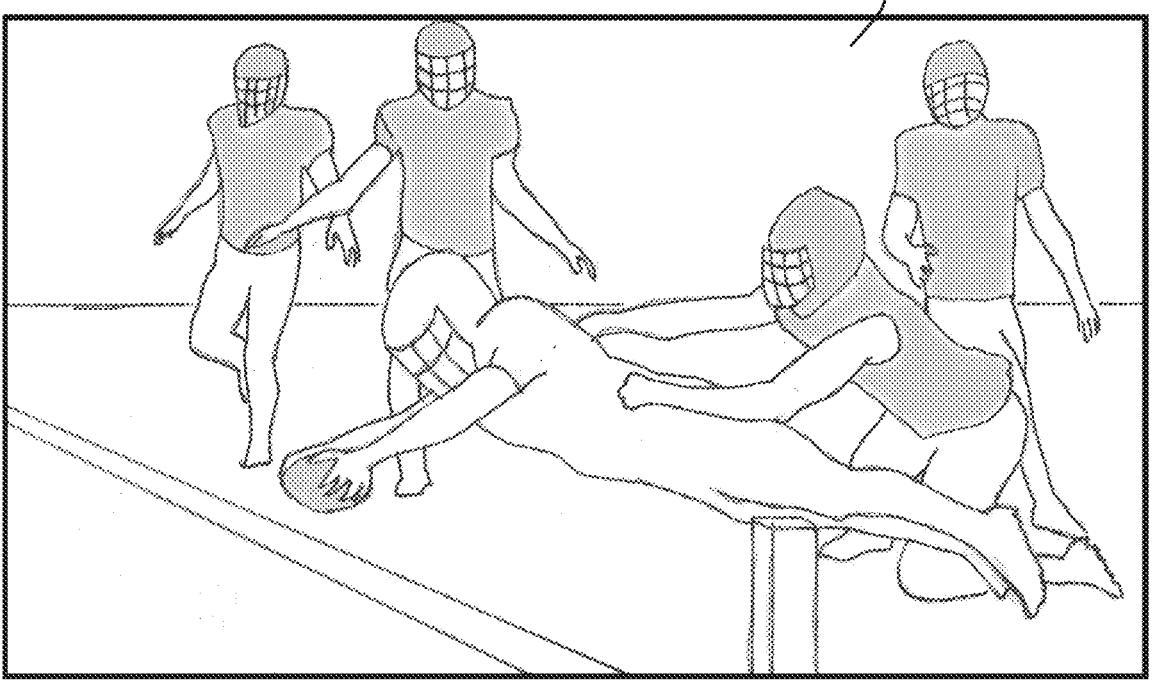
FIG. 2B is a screen shot of a frame from the event stream of a football game.

Similarly, the pop-up window 1121 in FIG. 11B shows the controls by which a user chooses settings for the layers to be enabled in a multiplane camera view of the football game shown in FIG. 2B. Some items are enabled with check boxes (e.g., the event layer, 1123, the audience layer, 1125, the foreground layer, 1133, and the participant layer, 1135). (There is no immersive layer in this sports production.) Other items use radio buttons, such as the choice between having an audience layer showing (a) football fans from the home team, 1127, (b) football fans from the visiting team, 1129, or a mix of supporters from both teams, 1131. Still other items are controlled by a slider, such as the control for the sizing of participant videos, 1117. Still other types of controls, as known to those skilled in the art are employed when appropriate.

Notice that the controls (1101 of FIG. 11A) for the rock concert are similar but somewhat different from the controls (1121 of FIG. 11B) for the football game. That's to be expected because real life physical venues for different types of events have different characteristics, and create different expectations in participants for what a virtual event should offer.

Now consider how these controls and layers work together.

Figure 12B:
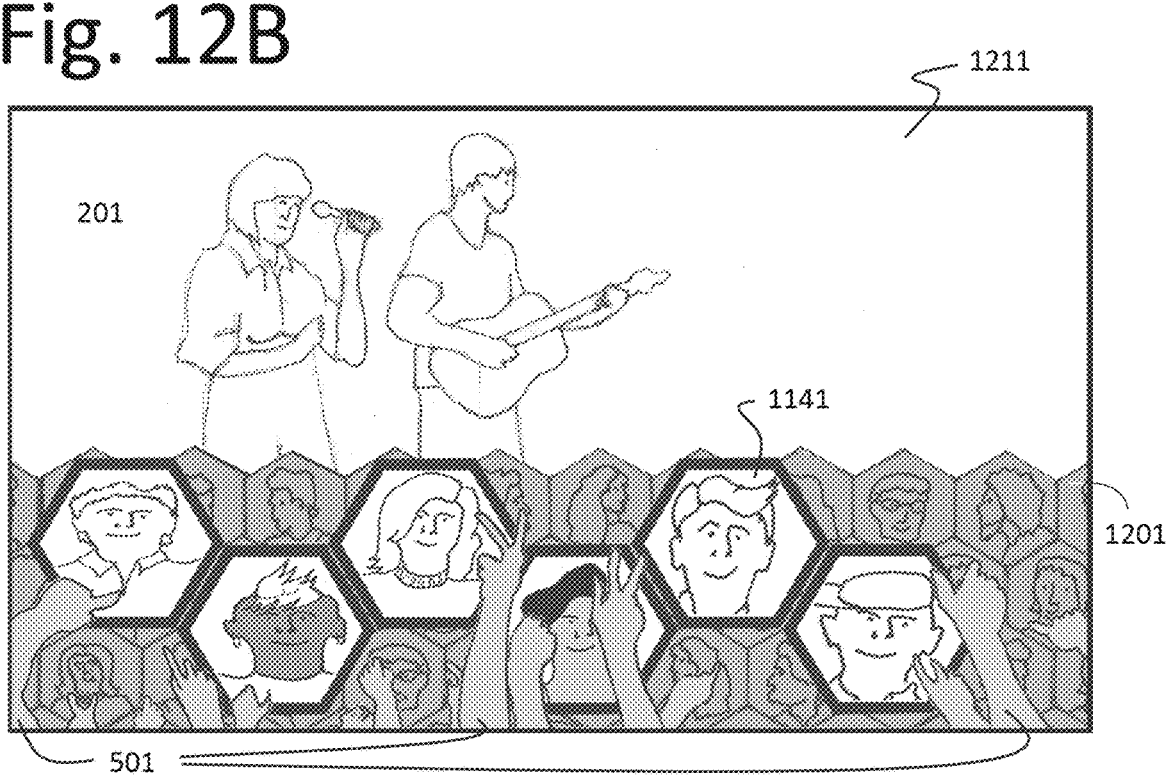
FIG. 12B is a screen shot from a multiplane camera view of a live concert as shown in FIG. 6A and FIG. 11A, but with the audience layer formed by compositing the video feeds of other participants, as shown in FIG. 12A.

Consider the rock concert example of FIG. 2A. Consider a preferred embodiment of the present invention as shown in FIG. 1B with event stream 201 of FIG. 2A, audience stream 301 of FIG. 3A, participant stream 421 of FIG. 4B, and foreground stream 501 of FIG. 5A. To produce the exemplar instances (discussed above) for a livestreamed rock concert, participant 141 simulates a. a front row seat at the concert by turning on the event stream (201) with control 161, and turning off the other streams with controls 151, 153, 155, 157, 159 and 163. This looks like 201 of FIG. 2A.

b. a view from the middle of the audience by turning on the event stream (201), audience stream (301), participant stream (421), and foreground stream (501) with controls 153, 155, 157, 159, and 161; and turning off the other streams with controls 151, 157, and 163. (For this example, the audience layer shows the audience standing and dancing, per user's choice 1107 of FIG. 11A.) This looks like 601 of FIG. 6A—when the sizing of participant videos, 1117, is set to minimum. In contrast, 1119, of FIG. 11A shows how it looks when the size of participant videos, 1117, is set near maximum. The software enlarges and reconfigure the participant videos, as shown in 1141. FIG. 12B shows how this looks (1211) when the sizing of participant videos (1141) is set to maximum and the audience layer (1201) is created from a composite of participant videos, per FIG. 12A.

c. a seat at the back of the stadium by turning on the event stream (201), audience stream (301), and participant stream (421) with controls 155, 159, and 161; and turning off the other streams with controls 151, 155, 157, and 163. This looks like 601 of FIG. 6A, except with the elimination of the foreground 501.

In an alternative embodiment, the system provides additional streams with controls for a participant to choose. Layers and streams are used to build an alternate immersive experience shown in FIG. 10. based on the music concert in 201 of FIG. 2A. Instead, to 201, consider adding the alternate audience stream 901 of FIG. 9A, an immersive scene 801 of FIG. 8A, and alternate participant layer processed for an immersive scene (921 of FIG. 9C showing the participants 923), and an alternate foreground stream 911 of FIG. 9B. Participant 141 simulates the group listening to the musicians in a club by turning on the event stream (201), the alternate audience stream (901) the immersive stream (801), the participant stream (921 with the participants shown as 923), and the foreground stream (911), using appropriate controls; and turning off the other streams and layers. For the multiplane interface of 1101, FIG. 11A, choosing the immersive scene (1111) automatically enables the club background and the immersive scene; it resizes the event stream to fit them; it selects the foreground layer if 1113 is enabled; it processes, positions and re-sizes the participant videos accordingly. The result looks like 1001 of FIG. 10. Participants choose such a setting if they are more interested in talking to each other, with the band playing more quietly in the background.

Consider the football game example of FIG. 2B. A preferred embodiment of the present invention produces similar varied immersive experiences of a livestreamed football game with event stream 203 of FIG. 2B, audience stream 311 of FIG. 3B, participant stream 421 of FIG. 4B, and foreground stream 511 of FIG. 5B. Participant 141 simulates:

a. a front row seat at the game by turning on the event stream (203) with control 161, and turning off the other streams with controls 151, 153, 155, 157, 159 and 163. This looks like 203 of FIG. 2B.

b. a view from the middle of the audience by turning on the event stream (201), audience stream (311), participant stream (421), and foreground stream (511) with controls 153, 155, 157, 159, and 161; and turning off the other streams with controls 151, 157, and 163. This looks like 603 of FIG. 6B—when the sizing of participant videos, 1137, is set to minimum. In contrast, 1139, of FIG. 11B shows how it looks when the size of participant videos, 1137, is set near maximum. The software enlarges and reconfigure the participant videos, as shown in 1141.

c. a seat at the back of the stadium by turning on the event stream (203), audience stream (311), and participant stream (421) with controls 155, 159, and 161; and turning off the other streams with controls 151, 155, 157, and 163. This looks like 603 of FIG. 6A, except with the elimination of the foreground 511.

In contrast, consider how "immersive scene view" currently appears in Zoom with its Immersive View, or the similar feature from Microsoft (Teams and Skype) called Together Mode. Importantly, and as noted previously, the share screen feature in Zoom or Microsoft cannot be implemented when immersive scene features are activated. For Microsoft see https://techcommunity.microsoft.com/t5/microsoft-teams-blog/how-to-get-the-most-from-together-mode/ba-p/1509496. For Zoom see https://support.zoom.us/hc/en-us/articles/360060220511-Immersive-View.

Microsoft currently implements immersive scenes in their Together Mode by embedding the participant videos (stripped of their backgrounds) within a static image which can consist of multiple static image layers. The background removal currently works well only when the participant's webcam captures just the participants upper torso, as would occur if the participant was seated in front of a desktop or laptop computer. The placement of the participant videos is fixed in the scene. Microsoft Together Mode preserves direction of participant gaze and gesture, but otherwise, Microsoft's use of immersive scenes is particularly static.

Microsoft's Together Mode replaces the participant layer (177), and the immersive layer (179), with a Together Mode layer, and precludes any event layer (183) using the share screen feature. Together Mode also precludes the possibility of other background layers (185), audience layers (181), and foreground layers (175). Because Microsoft's Together Mode cannot be used in the context of a live event stream, it teaches away from the present invention.

Zoom currently implements immersive scenes in its Immersive View by layering participant videos over one other layer. In Zoom-created immersive scene views and Zoom custom Immersive View, this layer is a single static graphic on which participant videos are overlaid in fixed positions on the graphic. Zoom's Immersive View cannot be used while sharing a screen. For this reason, Zoom-created Immersive Views and Zoom custom Immersive Views cannot be used in the context of a live event stream displayed within the application. Consequently, these Zoom implementations of immersive scene view teach away from the present invention.

As mentioned above, Zoom's Immersive View using the My Video option and a virtual camera is a way to cobble together a Zoom meeting with a live event stream with overlaid participant video feeds. However Zoom's Immersive View using the My Video option and a virtual camera not only precludes a foreground layer (175), but also replaces the immersive layer (179), event layer (183), background layers (185), and audience layers (181), with a single unified layer. Because Zoom precludes a foreground layer (175), and doesn't permit individual participant control of background layers (185), event layers (183), or audience layers (181), it teaches away from the present invention.

In comparison, Flymachine does not have an immersive scene view per se, but its "room" feature presents small participant thumbnail videos within a participant layer (177) that overlays the event layer (183), so that the combination appears similar in some respects to an immersive scene view in Zoom or Microsoft. As known to those skilled in the art, use of image processing techniques by virtual cameral applications like OBS or MultiCam allows Flymachine to create a visually rich event livestream that appears to have several different layers. However, Flymachine not only precludes a foreground layer (175) and a separate immersive layer (179), but also combines any and all other image layers—that is, any images and videos which might be used in the present invention in audience layers (181), event layers (183), and background layers (185)—into a single unified layer. Because Flymachine precludes a foreground layer (175), and does not permit individual participant control of background layers (185), event layers (183), or audience layers (181), it too teaches away from the present invention.

This disclosure has focused on a preferred embodiment with the live event stream produced at one location. In an alternative embodiment of the present invention, the host or webcast engineer can make any participant's video the live event stream. Consider an online gathering of musicians (and their fans) where the musicians are all located at a distance from each other. The musicians could then take turns—one at a time—playing for the entire audience. (Note the musicians are not trying to play together or at the same time while at different computers, because of lag times and latency issues.)

Figure 6A:
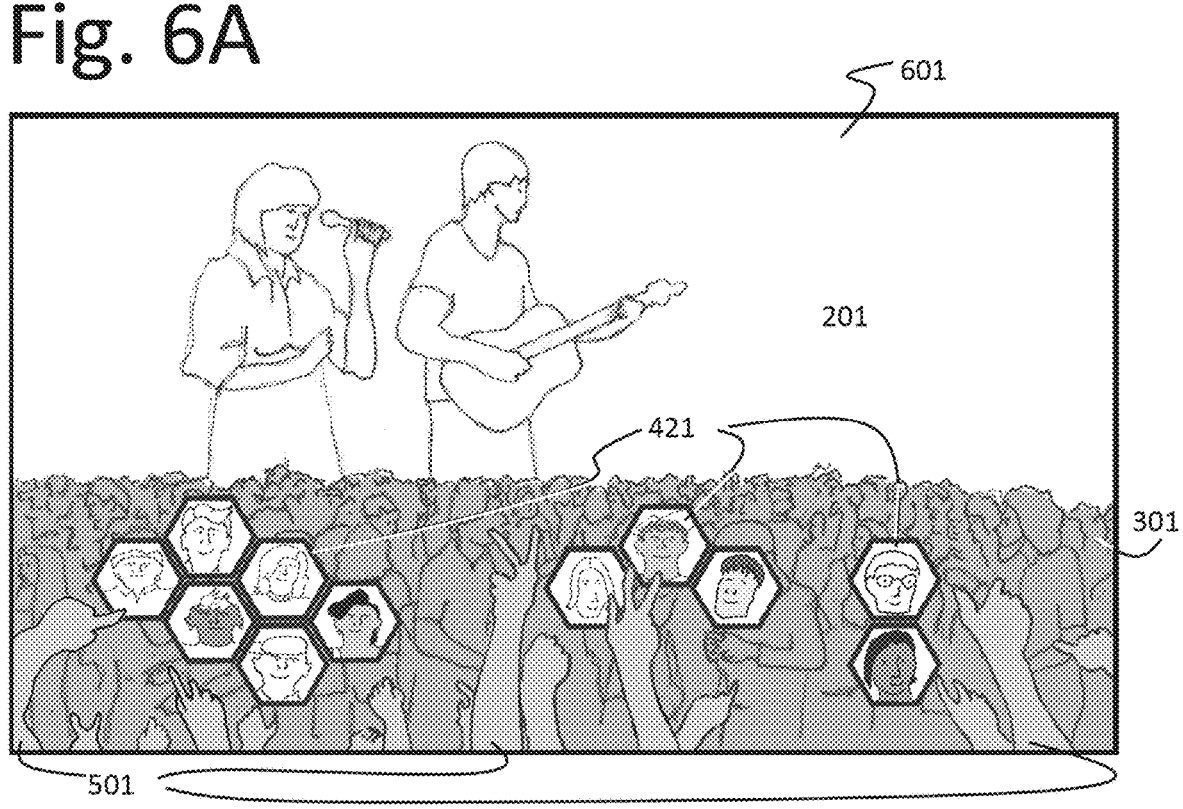
FIG. 6A is a screen shot from a multiplane camera view of a live concert, with event stream layer, audience layer, participant layer, and foreground layer.
Figure 6B:
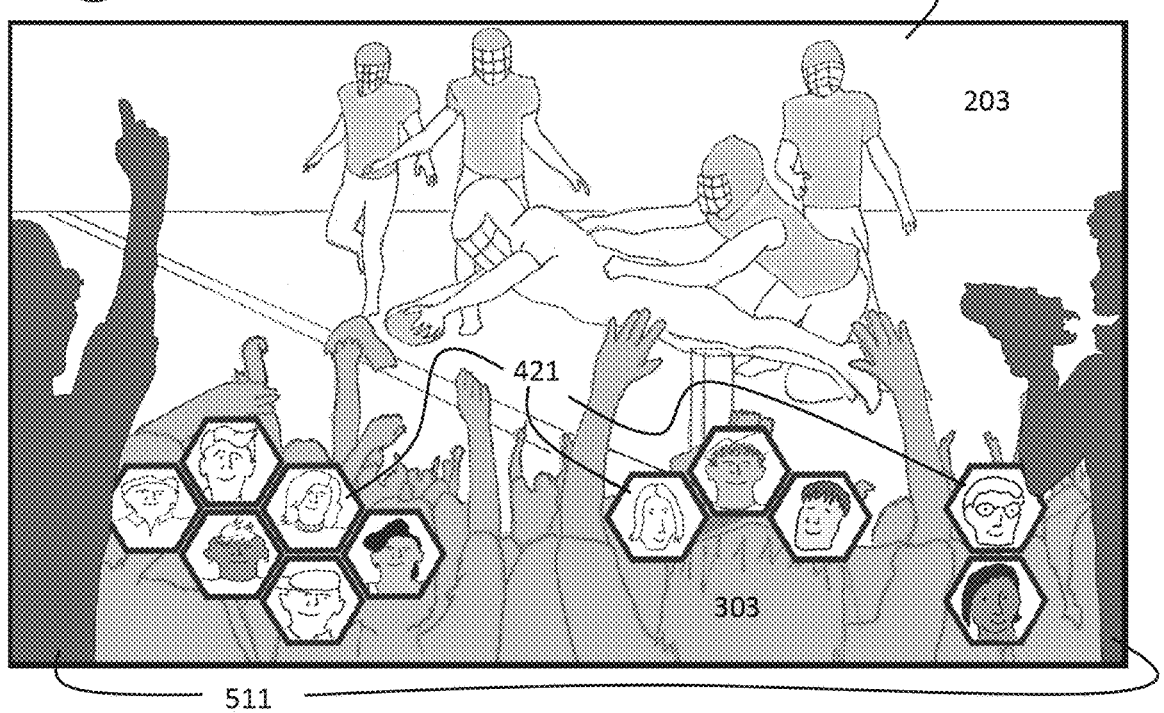
FIG. 6B is a screen shot from a multiplane camera view of a live football game, with event stream layer, audience layer, participant layer, and foreground layer.

In an alternative embodiment of the present invention, the participant layer uses AR background and body segmentation so each participant can dance—with his or her entire body and a transparent background—overlaid on the virtual dance floor within a crowd of virtual dancers. In other words, the videoconferencing platform includes AR body segmentation software and builds AR body segmentation into the controls for the participant layer 153. In this embodiment, FIG. 6A is re-rendered. Instead of the participant layer (421) consisting of clusters of hexagon-bordered headshot videos of the participants (as in FIG. 6A as drawn), the participants appear as clusters of dancers, with their real bodies, showing their dance moves.

As noted above the audience layer for one conversation circle (or breakout group) can be produced by body segmentation and compositing of other participants. When the team preferences of participants are known priors, then compositing of such videos can produce an audience layer composed of fans of one of the teams—or a mix of fans for both the teams. Fan preference can be obtained at login or sign-in via query. It can also be obtained programmatically, by listening for whom fans cheer.

As is known to those skilled in the art of AR, it is necessary to flip (that is, "mirror") participant images if one wants to preserve the direction of gaze and gesture. Otherwise, if the screen displays the participant videos as the image is recorded by the webcams. Then, when one participant (who is viewing the screen) looks at or points at the displayed image of another participant who appears on the screen the right of the first participant's image, the new image of the first participant will show him or her looking in the opposite direction (to the left). See for example, discussion by Jason Lanier about why Microsoft flips participant video feeds in their Together Mode: https://www-.techrepublic.com/article/microsoft-teams-this-new-mode-makes-your-video-meetings-less-exhausting-and-more-productive/. See also U.S. Pat. No. 11,330,021 (Slotznick).

An alternative embodiment of the present invention includes an option for participants to self-select to have the platform show a mirrored image of their camera-captured video feed to other participants. Another alternative embodiment couples mirroring with a visually distinct indication of that mirroring, so that other participants will know which video feeds are mirrored—in order to facilitate interacting among those who wish to do so.

An alternative embodiment of the present invention includes an option among the controls for the participant layer to mirror all participant videos. This mirroring provides more life-like interaction among participants in immersive scenes, or when participants are dancing within a virtual dance room or on a virtual dance floor.

Several current videoconferencing platforms allow participants to move displayed participant videos. For example, Zoom allows one participant (when using gallery view) to move the participant videos of all participants using drag and drop. Flymachine allows participants to drag their own videos to clusters of participants where participants then share audio and talk to each others. Similarly, Gatherly and Wonder allow participants to drag their icons/avatars into clusters and circles. For a participant to move participant videos in Zoom, Flymachine, Gatherly and Wonder, the participant must use a mouse. Gather allows participants to move their icons/avatars in the meeting space using keyboard direction keys (also called arrows keys and cursor keys)—requiring keyboard access.

One problem with trying to move one's video across a virtual dance space during a videoconference is that it is difficult for any participant to use a computer mouse or cursor key when the participant is dancing. This is in part because the participant is moving arms and hands to the music, whereas pressing a key or manipulating a mouse requires the hand to be steady and precise. In addition, using a computer mouse or cursor key becomes impossible when the participant is standing several feet away from the keyboard and is consequently too far from the mouse and keyboard to reach them.

However, as discussed above, it is well known by those skilled in the art, AR and AI software programs recognize a variety of hand gestures and body poses.

In an alternative embodiment of the present invention, the teleconferencing software recognizes participant gestures (including body poses, body orientation, directional gazes and gestures, and specific motions such as walking in a direction) to control placement of the participant's video. Gestures trigger the videoconference platform to move the placement of a video to the left or to the right. Gestures also trigger video placement up or down, and to appear closer or further from the viewer (by making the video image larger or smaller). In some visualizations that employ perspective, moving an image further away from the viewer requires not only making the video image smaller, but also requires moving the video image up on the screen, and backward in the layer stack behind other video images. In such visualizations, moving an image closer to the viewer requires the obverse: making the video image larger, moving the video image down on the screen, and moving it up a layer in front of other video images. In this way, as known by those skilled in the art, gesture can be used to move a video image in, out, left, right, and within a cluster of dancer video images. In one alternative embodiment, this gesture recognition is built into the videoconferencing platform, in another alternative embodiment, the platform will accept gesture triggers from third party software or hardware. In this way participants who are physically remote from each other dance together in the virtual space.

Those skilled in the art of augmented reality applications, know how a computing device with a camera (including a smart-phone) can calculate approximate distances within the room.

In an alternative embodiment, as a participant moves within the physical space in front of his or her webcam—that is, within the room which the webcam faces—the approximate distance of the participant from the camera is calculated, along with any changes in direction. Then that motion is translated into approximate changes in where the participant's video appears within the participant layer. The closer or further the participant moves from his or her webcam, the closer or further the participant's video appears, and when the participant moves to the left or right in front of the camera, that position change will be adjusted in the position of the participant's video within the participant layer. (Note, if mirroring of participant images has been implemented as discussed above, the relative change in position will be mirrored as well as adjusted.) This provides an alternative method (in addition to gestures and poses) for participants to navigate and interact in an immersive multiplane virtual space.

Note, in a multiplane architecture of the present invention, those skilled in the art of AR segmentation and gesture recognition know how to make animations (as well as videos with stripped out backgrounds) appear to move between layers and around participants and objects (that is both in front of, and behind them). See for example, https://lensstudio.snapchat.com/templates/object/hand-segmentation/ which shows how the AR of Lens Studio makes the animation of an airplane appear to fly around a person's hand.

In an alternative embodiment, when a participant moves his or her video feed among layers the sizing, framing, display, and focus of the layers are automatically adjusted on the participant's screen in the way (referenced above) that the layers of a physical multiplane camera are manually adjusted between frames to enhance the three dimensionality of the scene.

Those skilled in the art of augmented reality know how to create virtual objects with which a person—or rather the person's video feed—appears to interact. Examples include beer mugs that a user appears to pick up and wave when the user makes a fist. (See for example the beer mug created in Lens Studio that works with Snap Camera: https://lens.snapchat.com/89469d4937db48f8a9d5d3162a288c13, by Slotznick.)

In 2017, 10% to 35% of revenue for a touring rock musician came from the sale of physical branded merchandise (often called "merch" in the rock concert context): https://www.billboard.com/articles/news/magazine-feature/7800218/dell-furano-concert-tees-40-years. It is known by those skilled in the art of augmented reality how to create virtual hats, clothing, tattoos, and other virtual objects that are virtual analogies to the merchandise sold at rock concerts and other live events. Online events that use augmented reality and virtual camera technology provide an occasion to sell both physical and virtual merchandise. Just as importantly, they provide a place for fans to "wear" this virtual merchandise.

In an alternative embodiment of the present invention, the videoconferencing platform provides methods and means to buy, sell, store, save, wear, and use virtual merchandise, including, but not limited to, those produced conventionally and those produced as NFTs (non-fungible tokens).

In an alternative embodiment the event production team creates virtual objects with which the participant video feeds interact. For example, in FIG. 10, the waiters in the foreground layer (911) can appear to set virtual food or beverage in front of the participants (923) with which they can interact.

Much of the discussion above has focused on a preferred embodiment in which each participant can choose which layers her or she sees and how they are implemented. In an alternative embodiment a specified class of participants (such as hosts, co-hosts, webinar panelists, administrators, those who set up rooms, groups, clusters, circles or other subsets of participants) chooses which layers are implemented and displayed. For example, in the case of a music event, some "rooms" or "clusters" gather around a table in an immersive scene such as shown in FIG. 10, which encourages conversation among the group, while others join a dance floor such as FIG. 6A for a more energetic and physically-exertive interaction.

The present invention focuses on the video implementation of videoconferencing, not audio mixing. However, in an alternative embodiment, different environments have different volume presets for the live event versus conversation among the participants. For example, at a music live event, the music is set loud on the dance floor (FIG. 6A), but more muted (especially in contrast to participant conversation) at a table or booth (FIG. 10). See U.S. Pat. No. 11,282,532 (Slotznick).

In an alternative embodiment, one participant asks others via audio or text chat to join him or her in a particular experience or environment, such as "Want to dance?" or "Want to go to the ballroom?" or even "Want to sit this dance out and talk?" Acceptance of this proposal, puts the asker and those positively responding to the question into that experience or environment. In a preferred embodiment, acceptance is indicated by clicking on a proffered link in the text chat question. In an alternative embodiment, the question is asked via pop-up window, with acceptance indicated by clicking on a button or link in that window.

The disclosures above, for the most part, describe a preferred embodiment of the present invention built as a centralized videoconferencing platform with a hub-and-spoke distribution system that both (a) produces and provides the live event stream and (b) collects and distributes participant videos. In an alternative embodiment, a third party produces the initial live event (FIG. 1B, 103) and transmits it to the videoconferencing platform 105. In another alternative embodiment, the live event stream is transmitted to one of the participants (such as 111, 113, 115, 119 or 141) who shares it using the videoconferencing system.

Figure 1C:
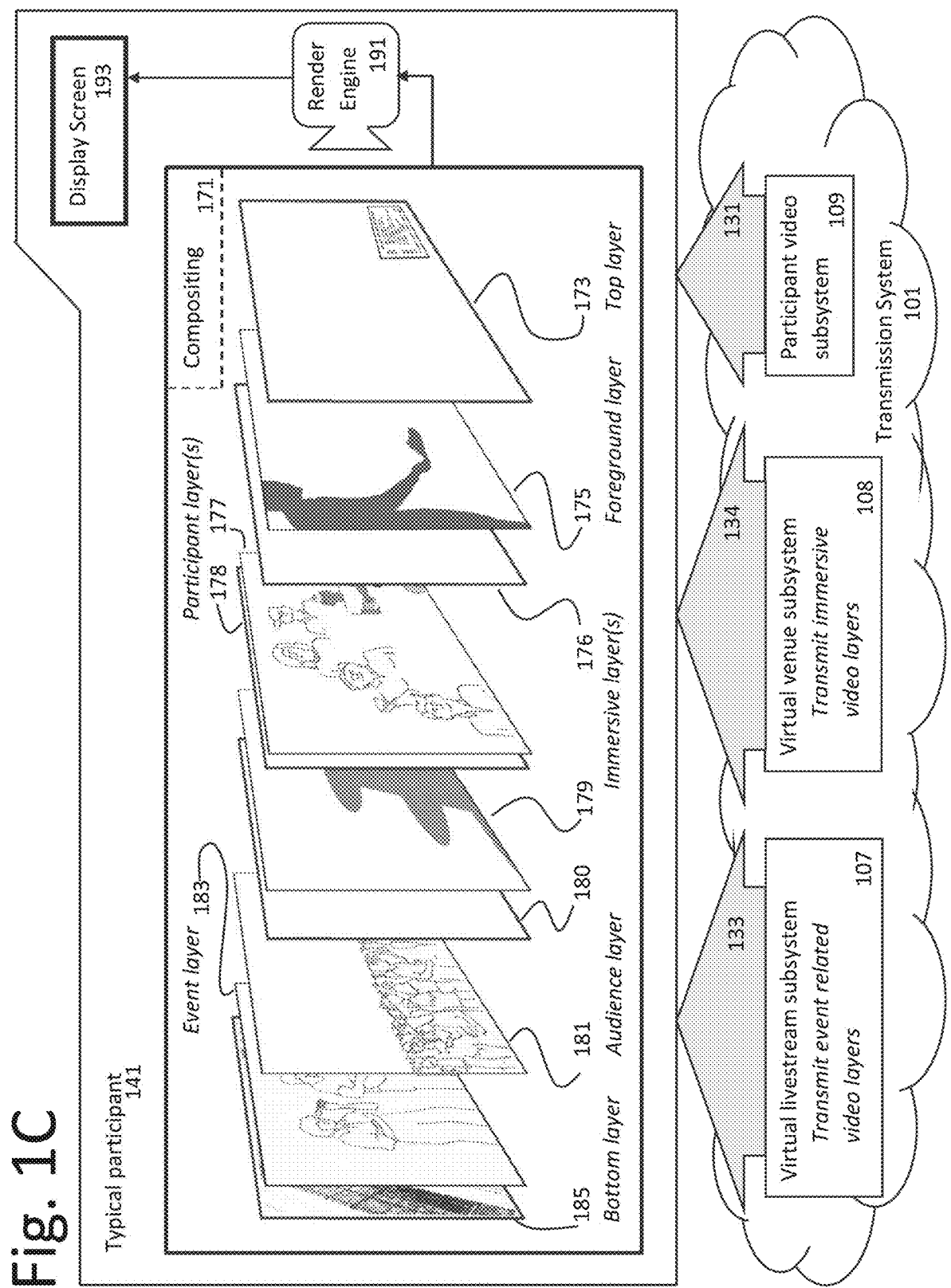
FIG. 1C is a more detailed view of parts of FIG. 1B.

In another alternative embodiment, illustrated in FIG. 1C, each participant (a) individually receives the stream of the live event from a third party (stream(s) 133 from livestream subsystem 107), (b) joins a separate, independent videoconferencing platform (that is, participant video subsystem 109 with participant video feeds 131), and (c) a third application—an independent bridging software application on each participant's computer—builds the multiplane camera view using additional video and graphic streams, using virtual camera and virtual audio device technology (including AR technology, such as practiced in MultiCam and OBS)— see virtual venue subsystem 108, with streams 134. These additional video and graphic streams include (but are not limited to) background images and videos 185, audience streams or videos 181, immersive scenes 176, 179, 180, and foreground videos 175. In other words, one provider gathers people together 109, another provides the entertainment 107, and still another provides a virtual venue in which the gathered people experience the entertainment 108.

The difference between the elements of FIG. 1B and FIG. 1C, is that (a) FIG. 1B combines both the virtual venue subsystem 108 and the immersive layer information it transmits, into the virtual livestream subsystem 107 (see control 157 of FIG. 1B), whereas FIG. 1C shows these two subsystems as separate.

(b) FIG. 1B shows the virtual livestream subsystem 107, the virtual venue subsystem 108 (see control 157 of FIG. 1B) and the participant video subsystem 109, as part of a single videoconferencing platform 105, whereas FIG. 1C does not. In this way FIG. 1C illustrates how the event stream, the virtual venue and the gathering of participants are each provided via a different platform. Each platform may have auxiliary studios 121 or webcast engineers 123, as shown in FIG. 1A and FIG. 1B.

(c) FIG. 1B shows only 7 streams (173, 175, 177, 179, 181, 183, and 185), whereas FIG. 1C illustrates how more streams (e.g., 176, 178, and 180) provided by the various subsystems supply video and image content for intertwining layers. (See how the participant layers 177 and 178 are sandwiched between immersive layers 176, 179 and 180.)

Different implementations of this embodiment have different subsystems and provide different layers for the multiplane view. For example, in one implementation of the present invention per the embodiment shown in FIG. 1C, the livestream subsystem 107 supplies video for the bottom layer (185) from background used at the event, the event layer (183) and the audience layer (181) from the audience at the event. The virtual venue subsystem 108 supplies video for the immersive scene (176, 179, and 180) and the foreground layer (175). The participant video subsystem 109 supplies video for the participant layers (177 and 178). Data and chat text from all three subsystems are combined by the venue subsystem and displayed on the top layer 173.

As a contrasting example, in another implementation of the present invention, the event subsystem 107 only provides the video for the event layer 183. The venue subsystem 108 provides video and images for the bottom layer (185), the immersive layers (176, 179 and 180) and the foreground layer 175. The participant video subsystem provides both the participant layers (177, 178) and creates a video composite of other participants to serve as the audience layer 181. Other implementations make different choices.

The use of control protocols such as Open Sound Control (OSC) allow audio-video production to be produced in a distributed manner. This means that the performers (talent, actors, musicians, etc.), tech support, AV (audio-video) producers and engineers, show control equipment and technicians, stored media servers, interactive media servers, sound synthesizers, visual synthesizers, and other electronic control, production, and compositing equipment are all in a plurality of distinct locations (at times distant from each other), linked via a network such as LAN (local area network), WAN (wide area network), or the internet, for real-time show production and control. OSC control has been brought to videoconferencing systems, including via software offerings by Liminal (Zoom OSC and Zoom ISO, purchased by Zoom in December 2021). Luminal products have been developed to enable offsite control of the Zoom interface and interconnection of Zoom outputs with such controllers and media servers (including Isadora by Troikatronix, see https://en.wikipedia.org/wiki/Isadora_(software)). Some interactive media servers support multiple video output channels. For example, Isadora currently supports up to 16 video output channels, which can be outputted to multiple hardware displays and projectors in a live theater context, or composited as a single stream for livestreaming over multiple channels. However, although technology such as Isadora can output the range of video streams necessary to create a multiplane-camera view, current videoconferencing platforms are not designed to simultaneously receive and display them.

In an alternative embodiment of the present invention, a videoconferencing platform creates a multiplane-camera view on a user's computer via a distributed network of AV resources, equipment, producers, technicians, and media servers, linked by control protocols such as, but not limited to, OSC. In this way, AV professionals can use much of the production hardware, software, and production techniques they currently employ to create novel online performance events.

In another alternative embodiment, the videoconferencing system architecture is peer-to-peer rather than hub-and-spoke. In an alternative embodiment, in order to minimize bandwidth and optimize computing resources, the videoconferencing system architecture conducts some image processing centrally, and other image processing at individual participant computers, which architecture is more distributed than hub-and-spoke without being true peer-to-peer.

The disclosure above focuses on the event displayed in the event layer as being a live stream. In an alternative embodiment, the event is pre-recorded and watching the playback synced among participants in ways known to those skilled in the art.

As another example, in another alternative embodiment, an Internet browser, such as Google Chrome, which can retrieve and display event content from the Internet, also supports a browser extension which layers the video feeds from a videoconferencing platform, such as Zoom or Google Meet, over the event content, along with the other multiplane layers described above. As is well known to those skilled in the art, many videoconferencing applications, including Zoom and Google Meet, have a browser-based version which extensions can access and augment.

Additional Considerations

A. Composite Video Stream (Composite Video)

The composite video stream as used herein is a video stream that includes a plurality of different video layers, wherein each video layer provides a different portion of the composite video stream. The composite video stream is the video that the participant views on the display screen 193. In one preferred embodiment, the composite video stream is the output of the processes performed by the render engine 191 and the compositing 171 process illustrated in FIG. 1B. Some or all of the video layers may be streaming video. For example, the participant layer will typically display video streams of the participants. Thus, even if the other layers are not streaming video layers, the video that is provided to the participant's display screen is referred to as a "composite video stream" because at least a portion of the video in the communication system that provides videoconferencing is streamed. More generally, the video provided to the participant's display screen is "composite video." Unless an event is prerecorded, the event layer would also typically be a streaming video layer.

B. Controls 155-163

The controls shown in FIG. 1B are not just intended to turn a layer on or off, or select among different options for a particular layer. What a control does will depend upon the implementation of the embodiment.

Consider for example, some of the controls shown in FIG. 1B. A foreground layer 175 (such as shown in FIG. 5A, FIG. 5B, or FIG. 9B) passes in front of the participant layer 177 obscuring part of it. In alternate embodiments, the foreground layer controls 155 include a slider (such as 1117 in FIG. 11A, which is used for sizing participant video feeds in layer 177) by which the user adjusts transparency (or opacity) of the foreground. In other embodiments, the foreground controls 155 include a color picker control (not shown, but known to those skilled in the art), so that color of the foreground adds a 3D component without becoming distracting. Likewise, in some implementations, where the audience layer 181 is to convey a sense of movement, rhythm and crowd excitement without overly obscuring the event layer 183, color and transparency (opacity) controls 159 allow the user to enhance the mood created by the audience layer 181.

Other ways to create and enhance mood in images (such as used in Photoshop x) deploy a plethora of effects, filters, styles, and graphics, from which a user may choose texture, brush stroke spacing, splatter radii, gradient direction, stroke length, intensity, contrast, grain type, cell size (and border thickness), gradient mode, luminosity, light quality, and other numerous effects known to those skilled in the art. In Photoshop, many of these attributes are adjusted using multiple sliders and drop-down lists. However, in an embodiment of the present invention, the creator of the layer is likely to limit user choice to a few attributes affecting the layer.

For similar reasons, in some embodiments, the audience layer 181 includes slider controls 159 of color saturation (from full camera-captured color to grayscale, with or without a tint). This enables the user to select a layer with fully detailed audience members; a layer of audience silhouettes; or something in-between.

In addition to the controls mentioned, the bottom layer 185 acts as an ultimate background for the experience. Controls 163 determine whether the background 185 is a uniform color, a gradient, a texture, a scenic image, a projected background such as the skybox or skydome used in videogames, or some other background known to those skilled in the art. In addition to these control choices implemented by the layer designer, in some embodiments, the designer employs as part of the bottom layer control 161, a pan/tilt control or grab-and-drag cursor control for the user to position his or her videoconference experience within a particular portion or vista of a digital panoramic or 360° image. Other designer choices include giving the user choice of Photoshop-style effects such as those mentioned above.

An immersive layer (or layers) 179 is intended to invoke or simulate a 3D effect of place—which is much more than just rendering furniture for participant portrait segmentations to "sit" on or at. An immersive layer designer has a whole range of effects, including (but not limited to) the AR effects used in Snap's Lens Studio. For example, lighting effects of color and direction can suggest indoor light or sunshine and time of day. Animation can model air movement. In an alternative embodiment, a designer enables controls 157 select an immersive scene 179 that ranges from peaceful beach at sunset, with palms gently waving, to a gale-force storm lashing the scene with a tempest pouring from darkened skies—or from a reggae concert at pool-side to one in a dimly lit speak-easy.

In the same way, lighting options added as controls 161 for the event layer 183, can change the mood of a concert from the crisp hard light of a bright summer's day at Woodstock to a dusky intimate jazz club at night.

The above discussion of layer controls—what they can affect, select, and modulate—is a small sampling of what is known to those skilled in the art, and the layer controls are not limited to those discussed above.

C. Use of Two or More Communication Systems for Layer Generation

In one alternative embodiment, the communication system includes more than one communication platform (CP), wherein one or more of the layers are generated in a different CP than the other layers. For example, consider the following scenarios/use cases that may employ multiple CP's.

1. A football game with virtual skyboxes
   a. CP1 broadcasts the event (the football game) over cable and internet channels.
   b. CP2 a videoconferencing platform, creates the participant layer, with private breakout rooms (virtual skyboxes) accessible through invitation.
   c. CP3 is an independent studio contracted by CP2 and the respective teams to use some of the participant video feeds to create team-centric audience layers that is transmitted separately from the videoconferencing platform to team subscribers.
   d. CP4 affiliated with the football league, sells league merchandise via widgets accessed in the foreground layer, but transmitted through the videoconferencing platform.
 2. A virtual venue for small jazz-club combos (or stand-up comics)
   a. CP1 creates and maintains an immersive scene as an app, made to give the look and feel of a small jazz club (or improv club).
   b. CP1 also creates an integrated audience layer and foreground, using animation and video loops.
   c. CP2 streams live jazz as events from small jazz clubs across the country (or improv nights at those clubs). The performance sets can be played directly by individuals on their home computers or played within the app, like a watch party.
   d. CP3 is a videoconferencing platform which provides the participant layer. Small groups of friends can start their own meeting online using a preferred videoconferencing provider, and then "go" to the virtual venue to listen to the performance together like an immersive watch party. The videoconferencing program provides the video feeds for anchors in the immersive scene.
 3. A live rock concert produced in a studio
   a. CP1 creates a pay-per-view concert event that is livestreamed, but with visual effects unlikely to be reproduced in a live concert. See review of Billy Eilish 2020 concert at https://www.rollingstone.com/music/music-live-reviews/billie-eilish-livestream-virtual-concert-1080748/
   b. CP1 also creates a merch/foreground layer.
   c. CP2 is a videoconferencing platform that provides the participant layer. It has made integration arrangements with "pay-per-view" providers.
   d. CP2 also produces audience and foreground layers from composites of video feeds from participants using its service.
 4. A stadium-filled rock concert with backstage party and online watch parties
   a. CP1 produces the rock concert and streams the event.
   b. CP1 also produces a back-stage party where party-goers can watch and dance to the livestreamed concert. The rock musicians will join them after the show. The during-show party is videoed by two or more camera operators to create an audience layer and a foreground layer. The audience layer is full color video; the foreground layer is transparent silhouette.
   c. CP2 is a videoconferencing platform which provides the participant layer. It has made integration arrangements with "pay-per-view" providers.
 5. Augmented reality dance party or hang-out.
   a. CP1 creates a virtual "world" to explore, such as a forest or coral reef, with many layers.
   b. CP1 also creates "creatures" to "populate" the world, such as animated AI-driven fish in a coral reef. This provides both audience and foreground layers.
   c. CP2 is a videoconferencing company, which provides the participant layer.
   d. CP3 provides AR gesture recognition, that is, triggers and controls by which participants navigate the world's layers.
   e. CP3 also provides AR costumes and accessories.
 6. Scenic meditation circles
   a. CP1 provides a scenic nature background (beach/mountains) which can be an image, an animated gif (or movie loop), a pre-recorded long movie, a livestream of a real place in the world, or a CGI created world such as Star Wars. It also builds in anchors for participant video streams.
  b. CP1 provides a lightly animated foreground layer, such as grasses moving lightly in a calming breeze.
  c. CP2 is a videoconferencing platform which provides the participant layer.

D. Communication System that Provides Videoconferencing Components

Figure 13:
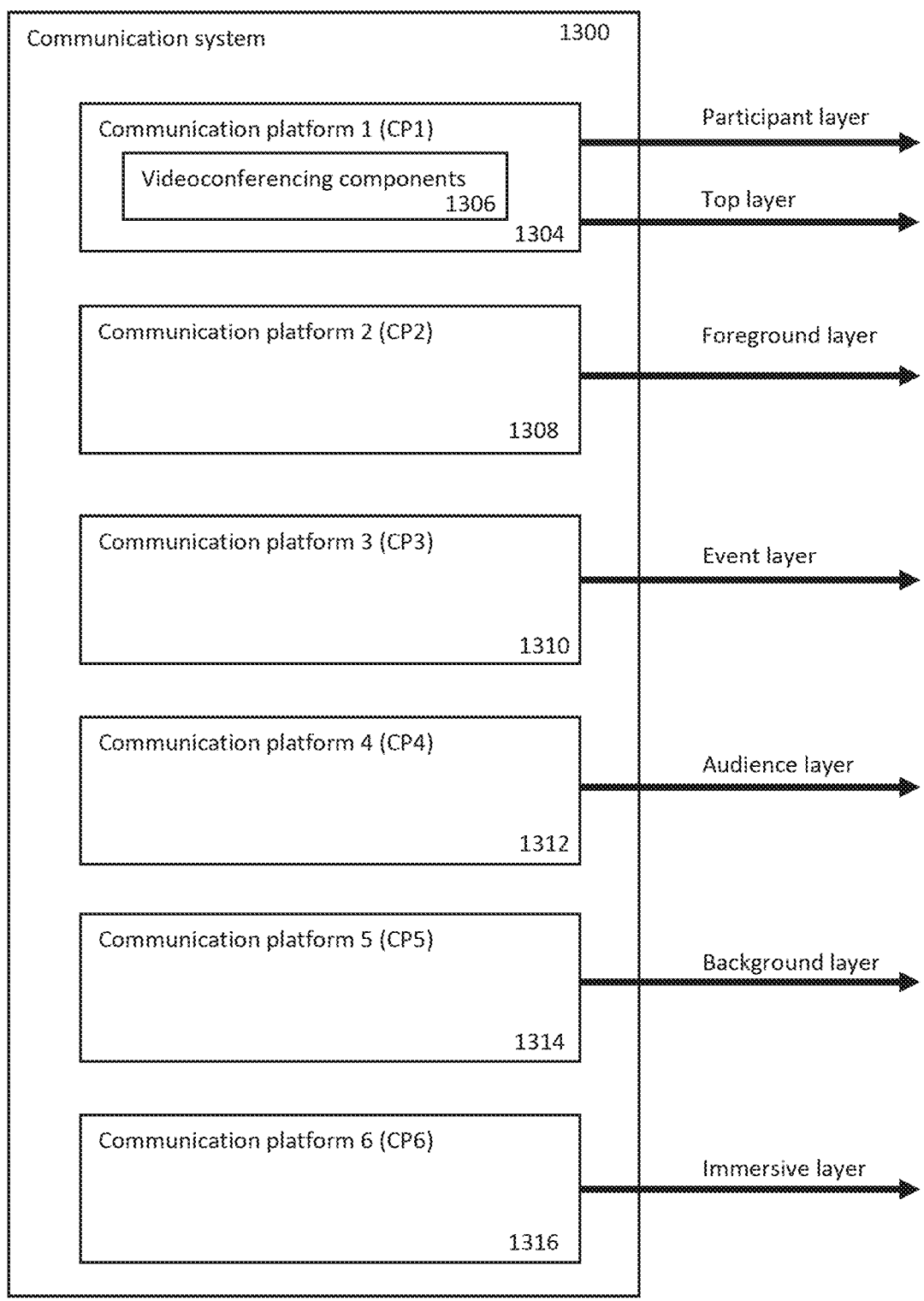
FIG. 13 is a schematic diagram of a communication system in accordance with one preferred embodiment of the present application.

FIG. 13 discloses communication system 1300 that includes a plurality of communication platforms CP1-CP6 (1304, 1308, 1310, 1312, 1314, 1316) for providing the respective layers. The communication platform 1034 includes videoconferencing components 1306 which provide a videoconferencing platform for generating the participant layer as well as the top layer. The other communication platforms (CP2-CP6) generate the foreground layer, the event layer, the audience layer, the background layer, and the immersive layer. In one embodiment, a single communication platform (not five separate platforms) provides all of the layers, other than the participant layer. The other communication platforms (CP2-CP6) do not necessarily have videoconferencing components 1306, but may include such components as needed. Thus, while FIGS. 1A and 1B show a videoconferencing platform 105, this platform may encompass sub-platforms that are merely communication platforms without videoconferencing components for producing the layers that do not need videoconferencing components.

E. Event May be Live or Prerecorded

In many of the examples above, the event streamed in the event layer is a live event, such as a live football game, a live rock concert, or a live stand-up comedian. However, in an alternative embodiment, the event streamed in the event layer has been previously recorded, and is streamed to the present invention over the internet from a media server in the cloud. Such streamed recordings are a staple of online entertainment, from videos archived on YouTube or Vimeo, to on-demand viewing of Hollywood produced movies through Netflix or Amazon, to recorded e-sport play on Twitch. In some cases, viewing or sharing such recorded videos are free, but in other cases, viewers must pay rental or subscription fees. Indeed, recorded live concerts and stand-up comedy acts are available on streaming services such as Netflix.

During the pandemic, friends have used share screen features of videoconferencing platforms such as Zoom to watch movies together. Many online webinars, that were originally presented live on a videoconferencing platform, are available as recorded videos that can be viewed with friends in a watch party setting.

Consider the virtual DJ sessions powering the "Off the Couch" dance parties produced live by Words Beats & Life, then recorded and archived on Vimeo: https://wblinc.org/offthecouch More recently, Flymachine is promoting a newer service to musicians who perform live at the North American independent venues, outfitted by Flymachine with 4K cameras and high-end streaming rigs. Flymachine records the streamed video of the live show in the cloud. The musician can then schedule a re-broadcast over the Flymachine videoconferencing system, and sell tickets to that rebroadcast. To entice rabid fans to the rebroadcast, the musician joins fans in private rooms to video chat with them while they watch the concert together.

F. Multiple Video Feed Layers

One feature of the present invention is the ability to provide a composite video stream in a videoconferencing environment having multiple video feed layers. For example, in many embodiments of the present invention, the participant layer, the foreground layer, and one or both of the event layer or the audience layer each include content with video or moving images. In contrast to Eisenberg et al., while Eisenberg et al. provides for videoconferencing, and thus includes video content equivalent to the participant layer, Eisenberg et al. does not describe multiple layers that include video (either streaming video, its pre-recorded equivalent, or software-created equivalents such as the characters, landscapes, and avatars created and animated via software in video games). For example, in the three layers disclosed in Eisenberg et al., and discussed at length, only the second layer results in the display of streaming video content. The first layer can define a background slide, which is a still image, and the third layer appears to be limited to associated-accessory-elements, such as labels and object borders.

G. Control of Layers During a User Session

One feature of the present invention is the ability of session participants to control parameters of a layer during a user session, and in some embodiments, move objects within the participant layer (that is, move the displayed location of participant video feeds). In this manner, for a session participant (user) who is viewing the session, the inputted control signals modify the composite video stream that is currently being displayed on the user interface display of the participant's participant computer. In contrast to Eisenberg et al., while Eisenberg et al. discloses how an individual may design layers prior to a session, Eisenberg et al. does not appear to disclose session participants controlling or modifying the layers during a videoconference session, or session participants moving objects within a layer during the session. Furthermore, as discussed above, Eisenberg et al. also does not appear to describe multiple layers that include video content.

H. Videoconferencing Session with "No Event/No Event Layer"

In the videoconferencing session examples illustrated above, there is an event that the participant is viewing during the videoconferencing session. However, in certain alternative embodiments, there is no actual event occurring during the videoconferencing session, and thus there is no event layer. The scope of the present invention encompasses such embodiments. For example, several former college friends, who now live far from each other, get together online to talk in a videoconferencing session, which does not include an event, but does include a multi-layered immersive scene that is similar to their college dorm room. Alternatively, they gather on a virtual bench in their dormitory courtyard, with people and their pets wandering in the background (audience layer) and foreground. As in their college days, they might even add background music to the scene from back in the day when they were in college. In another example, a company with distributed employees creates an online "break room", "coffee shop", or "water cooler"—as a multi-layered immersive scene—so that participants (company employees) can casually gather and exchange ideas. The notion is that a virtual room cannot provide food or drink to break up a task or energize a worker, but a multi-layered immersive scene can provide a visual break to get one thinking.

It should be appreciated by those skilled in the art that various modifications and variations may be made to the present invention without departing from the scope and spirit of the invention. It is intended that the present invention include such modifications and variations as come within the scope of the present invention.

What is claimed is:

1. A method for providing a user interface display to a participant who is viewing an event via a communication system that provides videoconferencing, the communication system providing a composite video stream that includes a plurality of different video layers, each video layer providing a different portion of the composite video stream, the participant having a participant computer for allowing the participant to receive the composite video stream for display on the user interface display, wherein a plurality of participants view the event via user interface displays of their respective participant computers, the method comprising:
   (a) generating, by videoconferencing components, a participant layer that displays video streams of the participants, the participant layer allowing for audiovisual communications among the participants;
   (b) generating, by the communication system, a foreground layer, wherein the foreground layer is a video stream that occurs independent of any interactions between the participants associated with the participant layer, and wherein a portion of the foreground layer is generated using artificial intelligence;
   (c) electronically communicating the layers generated in steps (a)-(b) to the participant computer; and
   (d) generating, by the participant computer, the composite video stream using the layers generated in steps (a)-(b) and electronically communicated to the participant computer for display on the user interface display of the participant's participant computer who is viewing the event.

2. The method of claim 1 wherein the communication system includes a plurality of different communication platforms which operate independent of each other, and wherein one of the layers in steps (a)-(b) is generated using one of the communication platforms, and the other layer in steps (a)-(b) is generated using a different communication platform.

3. The method of claim 1 wherein the event is a live event.

4. The method of claim 1 wherein the video streams of at least some of the participants are camera-captured views of the participants captured by cameras associated with respective participant computers.

5. The method of claim 1 wherein the video streams of at least some of the participants are still image icons or representations of the participants.

6. A method for providing a user interface display to a participant who is viewing a videoconferencing session via a communication system that provides videoconferencing, the communication system providing a composite video stream that includes a plurality of different video layers, each video layer providing a different portion of the composite video stream, the participant having a participant computer for allowing the participant to receive the composite video stream for display on the user interface display, wherein a plurality of participants view the videoconferencing session via user interface displays of their respective participant computers, the method comprising:
   (a) generating, by videoconferencing components, a participant layer that displays video streams of the participants, the participant layer allowing for audiovisual communications among the participants;
   (b) generating, by the communication system, a foreground layer, wherein the foreground layer includes video content, and wherein the foreground layer is a video stream that occurs independent of any interactions between the participants associated with the participant layer;
   (c) generating, by the communication system, another layer other than the participant layer and the foreground layer, the other layer being:
      (i) an event layer that includes video content of the videoconferencing session, or
      (ii) an audience layer that includes video content;
   (d) electronically communicating the layers generated in steps (a)-(c) to the participant computer; and
   (e) generating, by the participant computer, the composite video stream using the layers generated in steps (a)-(c) and electronically communicated to the participant computer for display on the user interface display of the participant's participant computer who is viewing the videoconferencing session.

7. The method of claim 6 wherein the communication system includes a plurality of different communication platforms which operate independent of each other, and wherein at least one of the layers in steps (a)-(c) is generated using one of the communication platforms, and at least one of the other layers in steps (a)-(c) is generated using a different communication platform.

8. The method of claim 7 wherein the other layer generated in step (c) is the event layer that includes video content of the videoconferencing session, and wherein the event layer is generated using the different communication platform.

9. The method of claim 8 wherein the videoconferencing session is a live event.

10. The method of claim 6 wherein the other layer is an event layer that includes video content of the videoconferencing session.

11. The method of claim 10 wherein the video content of the videoconferencing session is a video stream of the videoconferencing session.

12. The method of claim 6 wherein the video streams of at least some of the participants are camera-captured views of the participants captured by cameras associated with respective participant computers.

13. The method of claim 6 wherein the video streams of at least some of the participants are still image icons or representations of the participants.

14. A method for providing a user interface display to a participant who is viewing a videoconferencing session via a communication system that provides videoconferencing, the communication system providing a composite video stream that includes a plurality of different video layers, each video layer providing a different portion of the composite video stream, the participant having a participant computer for allowing the participant to receive the composite video stream for display on the user interface display, wherein a plurality of participants view the videoconferencing session via user interface displays of their respective participant computers, the method comprising:
   (a) generating, by videoconferencing components, a participant layer that displays video streams of the participants, the participant layer allowing for audiovisual communications among the participants;
   (b) generating, by the communication system, a foreground layer, wherein the foreground layer includes video content, and wherein the foreground layer is a video stream that occurs independent of any interactions between the participants associated with the participant layer;

(c) generating, by the communication system, an audience layer that includes video content,
wherein at least one of the foreground layer or the audience layer is generated using artificial intelligence;
(d) electronically communicating the layers generated in steps (a)-(c) to the participant computer; and
(e) generating, by the participant computer, the composite video stream using the layers generated in steps (a)-(c) and electronically communicated to the participant computer for display on the user interface display of the participant's participant computer who is viewing the videoconferencing session.

15. The method of claim 14 wherein the communication system includes a plurality of different communication platforms which operate independent of each other, and wherein at least one of the layers in steps (a)-(c) is generated using one of the communication platforms, and at least one of the other layers in steps (a)-(c) is generated using a different communication platform.

16. The method of claim 14 wherein the video streams of at least some of the participants are camera-captured views of the participants captured by cameras associated with respective participant computers.

17. The method of claim 14 wherein the video streams of at least some of the participants are still image icons or representations of the participants.

18. A method for providing a user interface display to a participant who is viewing an event via a communication system that provides videoconferencing, the communication system providing a composite video stream that includes a plurality of different video layers, each video layer providing a different portion of the composite video stream, the participant having a participant computer for allowing the participant to receive the composite video stream for display on the user interface display, wherein a plurality of participants view the event via user interface displays of their respective participant computers, the method comprising:

(a) generating, by videoconferencing components, a participant layer that displays video streams of the participants, the participant layer allowing for audiovisual communications among the participants;
(b) generating, by the communication system, a foreground layer, wherein the foreground layer includes video content, and wherein the foreground layer is a video stream that occurs independent of any interactions between the participants associated with the participant layer;
(c) generating, by the communication system, an audience layer that includes video content,
wherein at least one of the foreground layer or the audience layer is generated using augmented reality software;
(d) electronically communicating the layers generated in steps (a)-(c) to the participant computer; and
(e) generating, by the participant computer, the composite video stream using the layers generated in steps (a)-(c) and electronically communicated to the participant computer for display on the user interface display of the participant's participant computer who is viewing the event.

19. The method of claim 18 wherein the communication system includes a plurality of different communication platforms which operate independent of each other, and wherein at least one of the layers in steps (a)-(c) is generated using one of the communication platforms, and at least one of the other layers in steps (a)-(c) is generated using a different communication platform.

20. The method of claim 18 wherein the video streams of at least some of the participants are camera-captured views of the participants captured by cameras associated with respective participant computers.

21. The method of claim 18 wherein the video streams of at least some of the participants are still image icons or representations of the participants.

* * * * *